(12) United States Patent
Zimmerman et al.

(10) Patent No.: US 10,759,476 B2
(45) Date of Patent: Sep. 1, 2020

(54) SYSTEM AND METHOD FOR EXECUTING STRAIGHT TRACKING CONTROL OF A WORK VEHICLE

(71) Applicant: CNH Industrial America LLC, New Holland, PA (US)

(72) Inventors: Joshua D. Zimmerman, Willow Springs, IL (US); Andrea Gravili, Lecce (IT); Antonio Venezia, Turin (IT); Joseph R. Shoemaker, West Burlington, IA (US); Kushan Vora, Westmont, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/680,841

(22) Filed: Nov. 12, 2019

(65) Prior Publication Data

US 2020/0079426 A1  Mar. 12, 2020

Related U.S. Application Data

(63) Continuation of application No. 15/979,675, filed on May 15, 2018, now Pat. No. 10,494,019.

(51) Int. Cl.
*B62D 11/00* (2006.01)
*B62D 11/12* (2006.01)
(Continued)

(52) U.S. Cl.
CPC ............ *B62D 11/003* (2013.01); *B62D 11/12* (2013.01); *F16H 39/02* (2013.01); *F16H 61/47* (2013.01)

(58) Field of Classification Search
CPC ....... B62D 11/003; B62D 11/12; B62D 11/04; F16H 61/47; F16H 39/02
See application file for complete search history.

(56) References Cited

U.S. PATENT DOCUMENTS 3,459,273 A   8/1969  Leinhauser et al.
3,914,938 A   10/1975 Cornell et al.
(Continued)

FOREIGN PATENT DOCUMENTS

DE    202007005290 U1   6/2007
WO    WO2010/030283 A1  3/2010

OTHER PUBLICATIONS

Daewoo Heavy Industries Ltd., Daewoo DD80(L) New Bulldozer, Hydraulic Dozer, 6 pages.
(Continued)

*Primary Examiner* — David J Hlavka
(74) *Attorney, Agent, or Firm* — Peter Zacharias; Patrick Sheldrake

(57) ABSTRACT

A method for executing straight tracking control may include receiving an input command(s) associated with controlling the operation of a first-side drive system and/or a second-side drive system of a hydrostatic transmission of a work vehicle to drive the vehicle along a straight path. The method may also include receiving first and second speed signals associated with the output speeds of the drive systems, and modifying the first speed signal or the second speed signal based on a speed scaling factor to generate a corrected speed signal. In addition, the method may include determining an adjusted control command for controlling the operation of the hydrostatic transmission as a function of the input command(s) and a control output determined based on the corrected speed signal. Further, the method may include controlling the operation of the hydrostatic transmission based at least in part on the adjusted control command.

19 Claims, 10 Drawing Sheets

(51) Int. Cl.
*F16H 39/02* (2006.01)
*F16H 61/47* (2010.01)

(56) References Cited

U.S. PATENT DOCUMENTS

| | | | |
|---|---|---|---|
| 4,175,628 A | 11/1979 | Cornell et al. | |
| 5,249,422 A | 10/1993 | Smith et al. | |
| 5,511,367 A | 4/1996 | Powers et al. | |
| 5,822,961 A | 10/1998 | Busboom | |
| 5,848,520 A | 12/1998 | Arfstrom et al. | |
| 6,445,990 B1 | 9/2002 | Manring | |
| 6,549,837 B2 | 4/2003 | Feucht et al. | |
| 6,581,710 B2 | 6/2003 | Sprinkle et al. | |
| RE38,632 E | 10/2004 | Schmidt et al. | |
| 6,808,032 B2 | 10/2004 | Wuertz et al. | |
| 7,225,060 B2 | 5/2007 | O'Connor et al. | |
| 7,287,620 B2 | 10/2007 | Thomas et al. | |
| 7,762,360 B2 | 7/2010 | Saposnik | |
| 7,997,360 B2 | 8/2011 | Smith | |
| 8,108,109 B2 | 1/2012 | Young et al. | |
| 8,239,104 B2 | 8/2012 | Young et al. | |
| 8,306,699 B2* | 11/2012 | Scheer | B62D 11/003 701/41 |
| 8,364,356 B2 | 1/2013 | Young et al. | |
| 9,470,298 B2 | 10/2016 | Vora et al. | |
| 10,494,019 B1 | 12/2019 | Singh et al. | |
| 2006/0065465 A1 | 3/2006 | Lunzman et al. | |
| 2007/0225891 A1 | 9/2007 | Saposnik | |
| 2008/0086248 A1 | 4/2008 | Lu et al. | |
| 2008/0277188 A1* | 11/2008 | Hauser | B62D 3/02 180/422 |
| 2008/0300759 A1 | 12/2008 | Young et al. | |
| 2010/0106373 A1 | 4/2010 | Scheer | |
| 2010/0120578 A1 | 5/2010 | Bouguerra et al. | |
| 2011/0127093 A1 | 6/2011 | Koga et al. | |
| 2016/0039452 A1* | 2/2016 | Rotole | B62D 5/09 180/414 |
| 2018/0154934 A1 | 6/2018 | Fujiki et al. | |

OTHER PUBLICATIONS

Dynamic, DL Power Wheelchair Controller Installation Manual, No. 35290, Issue 2, Feb. 1998, 59 pages.
Rexroth Bosch Group, Application Software Dual Path Control DPC, RE 96 325/03.04, Mobile Hydraulics, Version 10, 16 pages. https://de-us.resource.bosch.com/media/us/products_13/product_groups_l/mobile_hydraulics_4/pdfs_6/re95325_2004-3.pdf.
Extended European Search Report issued in EP19174547.0 dated Oct. 9, 2019 (5 pages).

* cited by examiner

# SYSTEM AND METHOD FOR EXECUTING STRAIGHT TRACKING CONTROL OF A WORK VEHICLE

CROSS-REFERENCE TO RELATED APPLICATIONS

The present application is a continuation of U.S. patent application Ser. No. 15/979,675, filed May 15, 2018, the disclosure of which is hereby incorporated herein by reference in its entirety for all purposes.

FIELD OF THE INVENTION

The present subject matter relates generally to work vehicles and, more particularly, to a system and method for executing straight tracking control of a work vehicle having a dual-path electronically controlled hydrostatic transmission to allow the work vehicle to be driven along a straight path when straight travel is commanded by the operator.

BACKGROUND OF THE INVENTION

Certain types of work vehicles, such as skid steer loaders, bulldozers, and other crawler-type vehicles, include a dual-path electronically controlled hydrostatic transmission that is used for propulsion and steering of the vehicle. Specifically, the hydrostatic transmission typically includes an independent hydraulic pump and motor to drive each of the vehicle's left and right side drive components (e.g., left and right side wheels/tires or left and right side drive wheels/tracks). For example, a first hydraulic pump and motor may be provided for rotationally driving the vehicle's left side wheels while a separate hydraulic pump and motor may be provided for rotationally driving the vehicle's right side wheels. As such, the rotational speed of the left and right side wheels may be independently controlled, thereby allowing the vehicle to be steered. For example, by rotationally driving the left side wheels faster than the right side wheels, the work vehicle may be steered to the right. Similarly, by rotationally driving the right side wheels faster than the left side wheels, the work vehicle may be steered to the left.

Additionally, the operator of the work vehicle is typically provided with one or more input devices within the vehicle's cab, such as a left joystick and a right joystick, to provide independent control commands for regulating the drive speed of the left and right side drive components. For example, the operator may utilize the left joystick to provide suitable joystick commands for controlling the drive speed of the left side wheels and may utilize the right joystick to provide suitable joystick commands for controlling the drive speed of the right side wheels. In this regard, the operator may steer the work vehicle as it is being driven by adjusting the relative positioning of the left and right joysticks, thereby adjusting the relative drive speed of the left and right side wheels, respectively. Similarly, to drive the work vehicle along a straight path, the operator may move the left and right joysticks from their neutral position to the same forward or reverse position to provide equal joystick commands associated with driving the left and right side wheels at the same speed.

However, even when the operator commands that the work vehicle be driven along a straight path (e.g., by providing equal inputs via the left and right joysticks), the vehicle may veer to the left or right due to one or more factors, such as manufacturing tolerances, hydraulic driveline inefficiencies, "wear and tear" of the pump and motor components, loading conditions, differing tire sizes, etc. For instance, differences in the operating efficiencies between the left and right side pumps/motors may result in differing left/right side drive outputs despite the operator providing equal inputs into the system, thereby causing the vehicle to veer to the left or right. Similarly, even with equal drive outputs from the left and right side pumps/motors, the work vehicle may still veer to the left or right due to varying tire diameters between the left and right side tires (e.g., due to tire manufacturing tolerances and/or due to differing tire pressures). In this regard, prior art systems have been proposed that attempt to address this issue by allowing the drive output to the left and/or right side wheels to be adjusted, as necessary, to permit the work vehicle to track straight when so commanded by the operator. For example, known prior art systems allow an operator to manually input a trim adjustment that is directly applied to the joystick commands provided by the operator. However, despite such prior art systems, a need still exists for more efficient and/or effective systems for providing straight tracking control for a work vehicle having a dual-path, electronically controlled hydrostatic transmission.

Accordingly, an improved system and method for executing straight tracking control of a work vehicle to allow the vehicle to be driven along a straight path when so commanded by the operator would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a computer-implemented method for executing straight tracking control of a work vehicle having an electronically controlled hydrostatic transmission. The method may generally include receiving, with a computing device, at least one operator input command associated with controlling an operation of at least one of a first-side drive system or a second-side drive system of the hydrostatic transmission, with the at least one operator input command being associated with commanding the work vehicle to be driven along a straight path. The method may also include receiving, with the computing device, a first speed signal associated with a first output speed of the first-side drive system and a second speed signal associated with a second output speed of the second-side drive system, and modifying, with the computing device, one of the first speed signal or the second speed signal based on a speed scaling factor to generate a corrected speed signal. In addition, the method may include determining, with the computing device, an adjusted control command for controlling the operation of the hydrostatic transmission as a function of the at least one operator input command and a control output determined based at least in part on a differential between the corrected speed signal and the other of the first speed signal or the second speed signal. Further, the method may include controlling, with the computing device, the operation of the hydrostatic transmission based at least in part on the adjusted control command to drive the work vehicle along the straight path.

In another aspect, the present subject matter is directed to a system for executing straight tracking control of a work vehicle. The system may generally include a hydrostatic transmission having a first-side drive system and a second-side drive system, with the first side-drive system being configured to rotationally drive at least one corresponding drive output component located on a first side of the work vehicle, and the second-side drive system being configured to rotationally drive at least one corresponding drive output component located on a second side of the work vehicle. The system may also include a first speed sensor configured to detect a first output speed associated with the first-side drive system, and a second speed sensor configured to detect a second output speed associated with the second-side drive system. In addition, the system may include a controller communicatively coupled to the first and second speed sensors, with the controller including a processor and related memory. The memory may store instructions that, when implemented by the processor, configure the controller to receive at least one operator input command associated with controlling the operation of the first-side drive system or the second-side drive system, with the at least one operator input command being associated with commanding the work vehicle to be driven along a straight path. The controller may also be configured to receive a first speed signal from the first speed sensor associated with the first output speed of the first-side drive system and a second speed signal from the second speed sensor associated with the second output speed of the second-side drive system. In addition, the controller may be configured to modify one of the first speed signal or the second speed signal based on a speed scaling factor to generate a corrected speed signal. Moreover, the controller may be configured to determine an adjusted control command for controlling the operation of the hydrostatic transmission as a function of the at least one operator input command and a control output determined based at least in part on a differential between the corrected speed signal and the other of the first speed signal or the second speed signal. Furthermore, the controller may be configured to control the operation of the hydrostatic transmission based at least in part on the adjusted control command to drive the work vehicle along the straight path.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
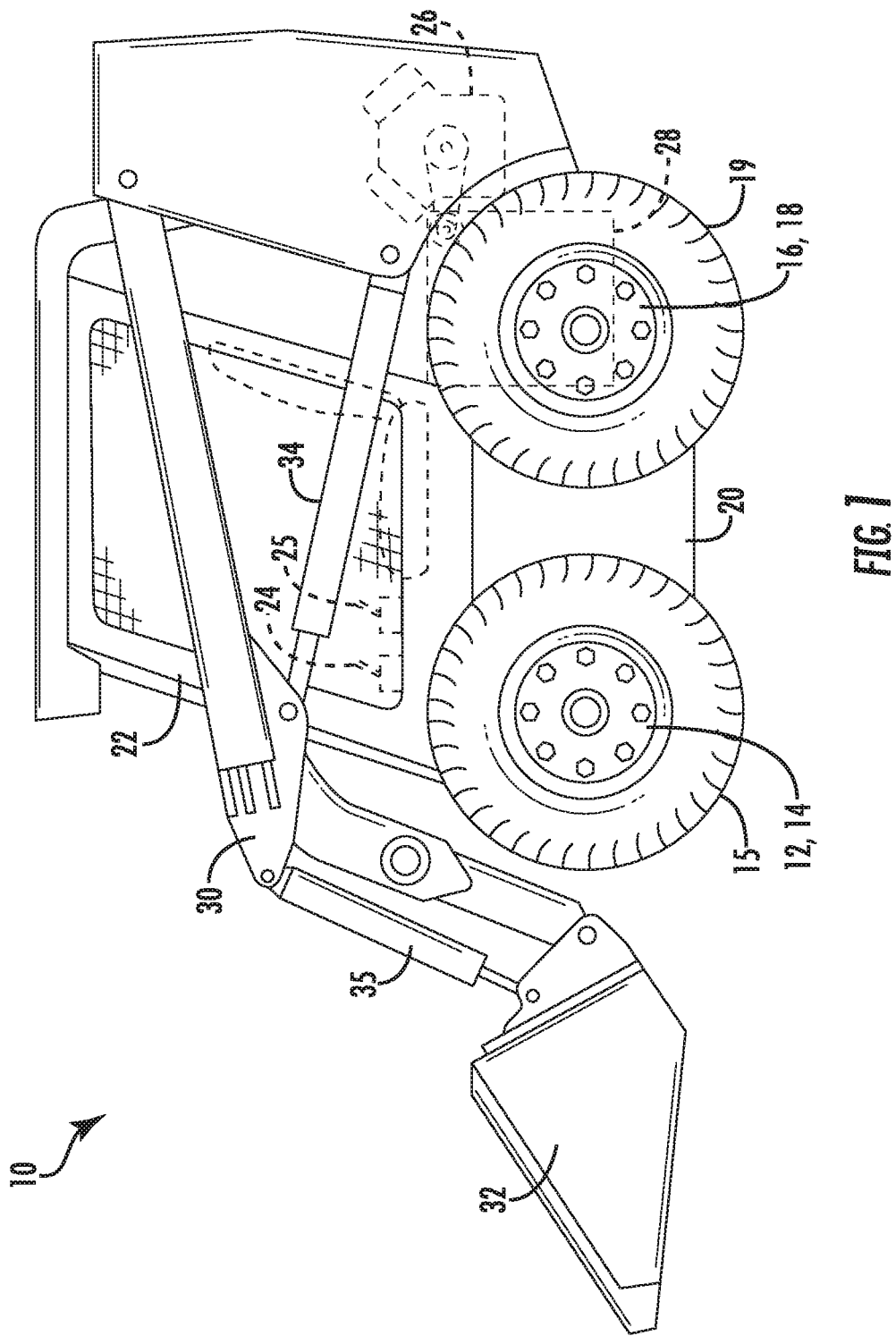
FIG. 1 illustrates a side view of one embodiment of a work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to improved systems and methods for executing straight tracking control of a work vehicle to allow the vehicle to be driven along a straight path when so commanded by the operator. Specifically, in several embodiments, the present subject matter is applicable to work vehicles having independently controlled drive systems for separately controlling the drive speed of the vehicle along each of its sides, such as any vehicle including a dual-path hydrostatic transmission. As will be described below, a controller of the disclosed system may be configured to utilize a speed scaling factor to modify a corresponding speed signal associated with the output speed of either the left-side drive system or the right-side drive system of the vehicle. In such instance, the speed scaling factor may be selected or set to account for any differences between the left-side and right-side drive systems that may otherwise result in the work vehicle veering to the left or right when straight travel is commanded, such as manufacturing tolerances for the vehicle's tires, differing tire pressures, misalignments between the wheel assemblies, load imbalances, and/or the like. The modified or corrected speed signal determined based on the speed scaling factor may then be used to determine a speed error between the left-side and right-side drive systems, which may then be input into a closed-loop control algorithm to determine a control output for modifying the input command(s) received from the operator (e.g., the joystick command(s)) in a manner that allows the work vehicle to track straight when commanded.

Figure 2:
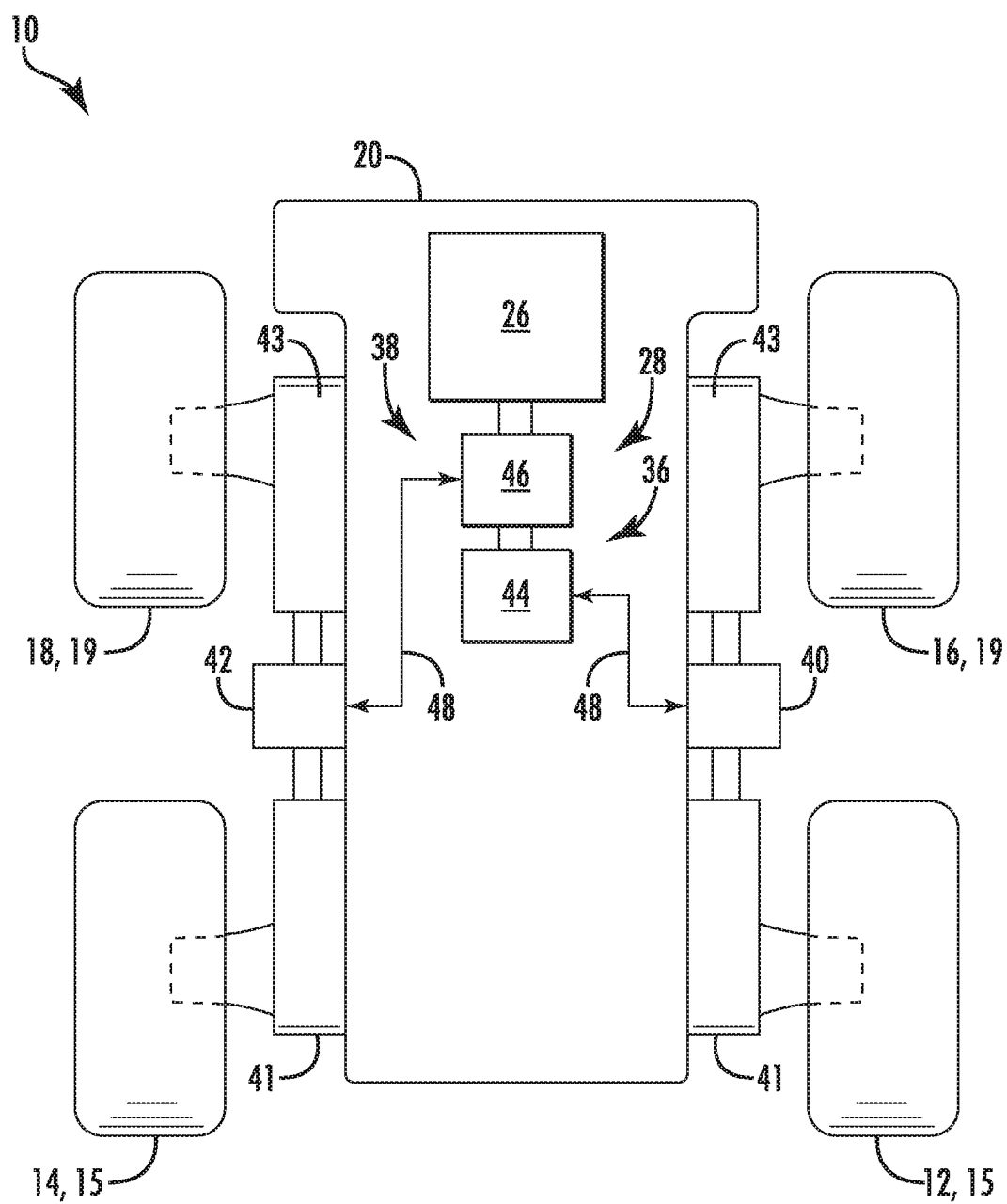
FIG. 2 illustrates a schematic view of various components of the work vehicle shown in FIG. 1, particularly illustrating one embodiment of a hydrostatic transmission of the work vehicle in accordance with aspects of the present subject matter.

Referring now to the drawings, FIGS. 1 and 2 illustrate different views of one embodiment of a work vehicle 10. Specifically, FIG. 1 illustrates a side view of the work vehicle 10 and FIG. 2 illustrates a schematic view of various components of the work vehicle 10 shown in FIG. 1. As shown, the work vehicle 10 is configured as a skid steer loader. However, in other embodiments, the work vehicle 10 may be configured as any other suitable work vehicle known in the art that includes independently controlled drive systems for separately controlling the drive speed of the vehicle along each of its sides, such as any vehicle including a dual-path hydrostatic transmission.

As shown, the work vehicle 10 includes a pair of front wheels 12, 14 (and associated front tires 15), a pair of rear wheels 16, 18 (and associated rear tires 19), and a chassis 20 coupled to and supported by the wheels 12, 14, 16, 18. An operator's cab 22 may be supported by a portion of the chassis 20 and may house various input devices, such as one or more speed/steering control levers or joysticks 24 and one or more lift/tilt levers or joysticks 25, for permitting an operator to control the operation of the work vehicle 10. In addition, the work vehicle 10 may include an engine 26 and a dual-path hydrostatic transmission 28 coupled to or otherwise supported by the chassis 20.

Moreover, as shown in FIG. 1, the work vehicle 10 may include a pair of loader arms 30 (one of which is shown) coupled between the chassis 20 and a suitable implement 32 (e.g., a bucket, fork, blade and/or the like). Hydraulic cylinders 34, 35 may also be coupled between the chassis 20 and the loader arms 30 and between the loader arms 30 and the implement 32 to allow the implement 32 to be raised/lowered and/or pivoted relative to the ground. For example, a lift cylinder 34 may be coupled between the chassis 20 and each loader arm 30 for raising and lowering the loader arms 30, thereby controlling the height of the implement 32 relative to the ground. Additionally, a tilt cylinder 35 may be coupled between each loader arm 30 and the implement 32 for pivoting the implement 32 relative to the loader arms 30, thereby controlling the tilt or pivot angle of the implement 32 relative to the ground.

As particularly shown in FIG. 2, the hydrostatic drive unit 28 of the work vehicle 10 may include a pair of independently controlled hydraulic drive systems (e.g., a first or left-side drive system 36 and a second or right-side drive system 38), with each drive system 36, 38 being configured to separately drive either the left-side 12, 16 or the right-side wheels 14, 18 of the work vehicle 10 via an associated hydraulic pump/motor. For example, as shown in the illustrated embodiment, the left-side drive system 36 includes a first or left hydraulic motor 40 configured to drive the left-side wheels 12, 16 via front and rear axles 41, 43, respectively, while the right-side drive system 38 includes a second or right hydraulic motor 42 configured to drive the right-side wheels 14, 18 via front and rear axles 41, 43, respectively. Alternatively, the motors 40, 42 may be configured to drive the wheels 12, 14, 16, 18 using any other suitable means known in the art, such as by coupling each motor 40, 42 to its respective pair of wheels via a suitable sprocket/chain arrangement (not shown). Additionally, each drive system 36, 38 may also include a separate hydraulic pump driven by the engine 26, which, in turn, supplies pressurized fluid to its respective motor. For example, in the illustrated embodiment, the left-side drive system 36 includes a first or left hydraulic pump 44 fluidly connected to the left motor 40 (e.g., via a suitable hydraulic hose or other fluid coupling 48) while the right-side drive system 38 includes a second or right hydraulic pump 46 fluidly connected to the right motor 40 (e.g., via a suitable hydraulic hose or other fluid coupling 48).

In the illustrated embodiment, by individually controlling the operation of each pump 44, 46, the speed of the left-side wheels 12, 16 may be regulated independent of the right-side wheels 14, 18. For example, each pump 44, 46 may include or be associated with one or more electronically controlled actuators (e.g., forward and reverse solenoids coupled to a control piston) configured to adjust the position of its associated swashplate, thereby allowing the displacement of the pump 44, 46 to be automatically adjusted. As such, by adjusting the displacement of the left pump 44, the flow of the hydraulic fluid supplied to the left motor 40 may be varied, thereby adjusting the output speed of the motor 40 and, thus, the associated drive speed of the left-side wheels 12, 16. Similarly, by adjusting the displacement of the right pump 46, the flow of the hydraulic fluid supplied to the right motor 42 may be varied, thereby adjusting the output speed of the motor 42 and, thus, the associated drive speed of the right-side wheels 14, 18.

It should be appreciated that the configuration of the work vehicle 10 described above and shown in FIGS. 1 and 2 is provided only to place the present subject matter in an exemplary field of use. Thus, it should be appreciated that the present subject matter may be readily adaptable to any manner of work vehicle configuration. For example, in an alternative embodiment, the work vehicle 10 may be configured as a tracked vehicle and, thus, may include tracks as opposed to wheels/tires. In such an embodiment, each motor 40, 42 may be configured to rotationally drive an associated drive wheel of the tracked vehicle that, in turn, is coupled to and drives an endless track. Accordingly, it should be appreciated that any suitable drive output component(s) (including wheels/tires or a drive wheel/track) may be included within or otherwise associated with each of the left-side and right-side drive systems 36, 38 for propelling and/or steering the work vehicle 10.

Figure 3:
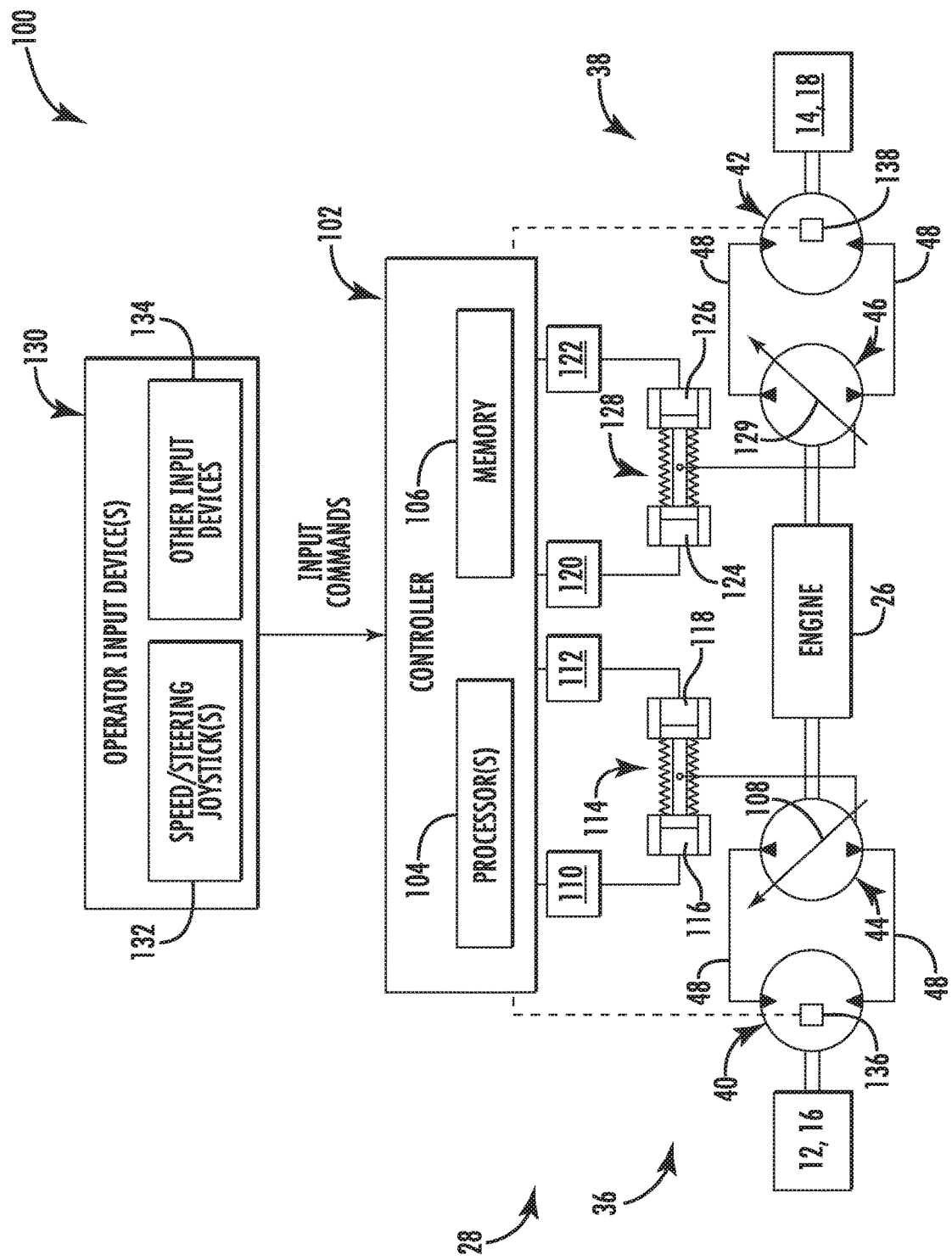
FIG. 3 illustrates a schematic view of one embodiment of a suitable control system for controlling various components of a work vehicle in accordance with aspects of the present subject matter, particularly illustrating the control system configured for controlling components of the hydrostatic transmission of the work vehicle.

Referring now to FIG. 3, one embodiment of a control system 100 suitable for controlling the various components of a work vehicle is illustrated in accordance with aspects of the present subject matter. In general, the control system 100 will be described herein with reference to the work vehicle 10 described above with reference to FIGS. 1 and 2. However, it should be appreciated by those of ordinary skill in the art that the disclosed system 100 may generally be utilized to control one or more components of any suitable work vehicle.

As shown, the control system 100 includes a controller 102 configured to electronically control the operation of one or more components of the work vehicle 10, such as the various hydraulic components of the work vehicle 10 (e.g., the hydrostatic transmission 28). In general, the controller 102 may comprise any suitable processor-based device known in the art, such a computing device or any suitable combination of computing devices. Thus, in several embodiments, the controller 102 may include one or more processor(s) 104 and associated memory device(s) 106 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 106 of the controller 102 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 106 may generally be configured to store suitable computer-readable instructions that, when implemented by the processor(s) 104, configure the controller 102 to perform various computer-implemented functions, such as the various aspects of the calibration routines and/or other control methodologies described herein. In addition, the controller 102 may also include various other suitable components, such as a communications circuit or module, one or more input/output channels, a data/control bus and/or the like.

It should be appreciated that the controller 102 may correspond to an existing controller of the work vehicle 10 or the controller 102 may correspond to a separate processing device. For instance, in one embodiment, the controller 102 may form all or part of a separate plug-in module that may be installed within the work vehicle 10 to allow for the disclosed system and method to be implemented without requiring additional software to be uploaded onto existing control devices of the vehicle 10.

As shown in FIG. 3, the controller 102 may be communicatively coupled to various components for controlling the operation of the hydraulic pumps 44, 46 (and, thus, the hydraulic motors 40, 42) of the left-side and right-side drive systems 36, 38 of the hydrostatic transmission 28. For purposes of description, the various components for controlling the operation of the left hydraulic pump 44 and the associated left hydraulic motor 40 will be described below in detail with reference to FIG. 3. However, it should be appreciated that the components for controlling the operation of the right hydraulic pump 46 and the right hydraulic motor 42 may function the same or similar as those for the left/pump/motor to provide the desired operation.

As indicated above, the hydraulic pump 44 may be driven by the engine 26 and may be fluidly connected to the hydraulic motor 40 via suitable fluid couplings 48 (e.g., hydraulic hoses). The hydraulic motor 40 may, in turn, drive the left-side wheels 12, 16 of the vehicle 10. In several embodiments, the motor 40 may be configured as a fixed displacement motor while the hydraulic pump 44 may be configured as a variable displacement pump. Accordingly, to change the rotational speed of the motor 40 (and, thus, the rotational speed of the wheels 12, 16), the displacement of the hydraulic pump 44 may be varied by adjusting the position or angle of a swashplate (indicated by the arrow 108) of the pump 44, thereby adjusting the flow of hydraulic fluid to the motor 40.

To electronically control the displacement of the swashplate 108, the controller 102 may be commutatively coupled to suitable pressurize regulating valves 110, 112 (PRVs) (e.g., solenoid-activated valves) configured to regulate the pressure of hydraulic fluid supplied to a control piston 114 of the pump 44. Specifically, as shown schematically in FIG. 3, the controller 102 may be coupled to both a forward PRV 110 configured to regulate the pressure of the hydraulic fluid supplied to a forward chamber 116 of the control piston 114 and a reverse PRV 112 configured to regulate the pressure of the hydraulic fluid supplied to a reverse chamber 118 of the control piston 114. By pressurizing the forward chamber 116, the swashplate 108 of the pump 44 may be displaced such that hydraulic fluid flows through the fluid loop defined between the pump/motor 44, 40 in a manner that causes the motor 40 to drive the wheels 12, 16 in the forward direction. Similarly, by pressurizing the reverse chamber 118, the swashplate 108 may be displaced such that hydraulic fluid flows through the fluid loop in a manner that causes the motor 40 to drive the wheels 12, 16 in the reverse direction.

As is generally understood, the current supplied to each PRV 110, 112 is directly proportional to the pressure supplied to its corresponding chamber 116, 118, the pressure difference of which is, in turn, directly proportional to the displacement of the swashplate 108. Thus, for example, by increasing the current command to the forward PRV 110 by a given amount, the pressure within the forward chamber 116 and, thus, the angle of the swashplate 108 may be increased by a proportional amount(s). As the angle of the swashplate 108 is increased, the flow of hydraulic fluid supplied to motor 40 is similarly increased, thereby resulting in an increase in the rotational speed of the wheels 12, 16 in the forward direction. A similar control strategy may be used to increase the rotational speed of the wheels 12, 16 in the reverse direction by increasing the current command supplied to the reverse PRV 112.

As indicated above, the various components associated with the right-side pump/motor 46, 42 may function or operate the same as or similar to the corresponding components associated with the left-side pump/motor 44, 40. For example, as shown in FIG. 3, the controller 102 may be communicatively coupled to respective forward and reverse PRVs 120, 122 (e.g., solenoid-activated valves) for regulating the pressure of hydraulic fluid supplied to forward and reverse chambers 124, 126, respectively, of an associated control piston 128 of the right hydraulic pump 46. By pressurizing the forward chamber 124 (or the reverse chamber 126), a swashplate (indicated by arrow 129) of the right hydraulic pump 46 may be displaced such that hydraulic fluid flows through the fluid loop defined between the pump 46 and associated motor 42 in a manner that causes the motor 42 to drive the right-side wheels 14, 18 in the forward direction (or the reverse direction). As such, by adjusting the current command to the forward PRV 120 (or the reverse PRV 122) by a given amount, the pressure within the forward chamber 124 (or the reverse chamber 126) and, thus, the angle of the swashplate 129 may be adjusted by a proportional amount(s), which may, in turn, adjust the flow of hydraulic fluid supplied to motor 42, thereby resulting in the rotational speed of the wheels 14, 18 being varied.

Additionally, as shown in FIG. 3, the controller 102 may be communicatively coupled to one or more input devices 130 for receiving input commands from the operator. For example, as indicated above, the controller 102 may be communicatively coupled to one or more joysticks 104 (e.g., speed/steering joystick(s) 24 shown in FIG. 1) to allow the operator to provide speed/steering inputs to the controller 102 for controlling the operation of the left-side and right-side drive systems 36, 38. Specifically, in one embodiment, the work vehicle 10 may include both a left joystick for allowing the operator to provide input commands (e.g., left joystick commands) for controlling the operation of the left-side drive system 36 and a right joystick (or other suitable input device) for allowing the operator to provide input commands (e.g., right joystick commands) for controlling the operation of the right-side drive system 38. Alternatively, the work vehicle 10 may include a single speed/steering joystick for providing input commands (e.g., both left and right joystick commands) for controlling the operation of the left-side and right-side drive systems 36, 38. Regardless, based on the left and right joystick commands received from the operator, the controller 102 may, in turn, be configured to provide suitable pump commands (e.g., in the form of current commands to the associated PRVs 110, 112, 120, 122) for controlling the operation of each pump 44, 46. For example, if the left and right joystick commands received from the operator indicate that the operator desires to travel along a straight path (e.g., when equal inputs are received from the left and right joysticks or when the single joystick is pushed straight forward or backwards), the controller 102 may be configured to transmit suitable pump commands for controlling the left-side and right-side drive systems 36, 38 in a manner that results in straight travel of the work vehicle 10. Similarly, if the left and right joystick commands received from the operator indicate that the operator desires to steer left or right (e.g., when the inputs received from the left and right joysticks differ or when the single joystick is moved to the left or the right), the controller 102 may be configured to transmit suitable pump commands for controlling the left-side and right-side drive systems 36, 38 in a manner that results in the work vehicle 10 being steered in the desired direction.

In addition, the work vehicle 10 may also include various other input devices 134 for allowing the operator to provide inputs to the controller 102. For example, various other input devices 134 may be located within the vehicle's cab 22, such as buttons, knobs, levers, display panels (e.g., touch screen panels), and/or the like provided along the vehicle's control panel or otherwise positioned at an accessible location with the cab 22. Such input devices 134 may also include buttons or other interface elements provided in association with other input devices, such as when the joystick(s) 132 is configured as a multi-function joystick or lever and includes various different buttons or elements associated therewith. In addition, the input devices 134 may also include auxiliary input devices that allow the operator (including service technicians) to interface with the controller 102, such as laptops, service tools, and/or other devices that may be coupled to the controller 102 via a suitable port or other I/O channel or means associated with the work vehicle 10.

In addition, the controller 102 may also be communicatively coupled to one or more sensors for monitoring one or more operating parameters of the work vehicle 10, such as one or more sensors for monitoring the operation of the hydrostatic transmission 28. For example, as shown in FIG. 3, the controller 102 may be communicatively coupled to one or more speed sensors 136, 138 for monitoring an output speed of each of the drive systems 36, 38. Specifically, in the illustrated embodiment, the controller 102 is coupled to a left-side speed sensor 136 for monitoring the output speed of the left-side drive system 36, such as by monitoring the output speed of the left hydraulic motor 40. Additionally, the controller 102 is also coupled to a right-side speed sensor 138 for monitoring the output speed of the right-side drive system 38, such as by monitoring the output speed of the right hydraulic motor 42. As will be described below, the speed signals received from the left-side and right-side speed sensors 136, 138 may be utilized by the controller to execute a straight tracking control system to allow the work vehicle 10 to be driven in a straight line when so commanded by the operator, such as by using the speed signals as feedback into a closed-loop control algorithm for calculating a control output for modifying one or both of the joystick commands received from the operator.

It should be appreciated that the system configuration shown in FIG. 3 is simply illustrated to provide one example of a suitable system configuration in accordance with aspects of the present subject matter. In other embodiments, the system configuration may have any other suitable configuration. For instance, in one embodiment, the hydraulic motors may also correspond to electronically controlled, variable displacement motors. In such an embodiment, the output speed of each drive system 36, 38 may be controlled by adjusting the displacement of the pumps and/or the motors. Similarly, in another embodiment, the hydraulic pumps may include swash angle sensors to provide closed-loop feedback to the controller for controlling the PRVs. In such an embodiment, the controller may configured to regulate the operation of the PRVs to achieve a desired swash angle(s) based on the feedback provided by the sensors.

Figure 4:
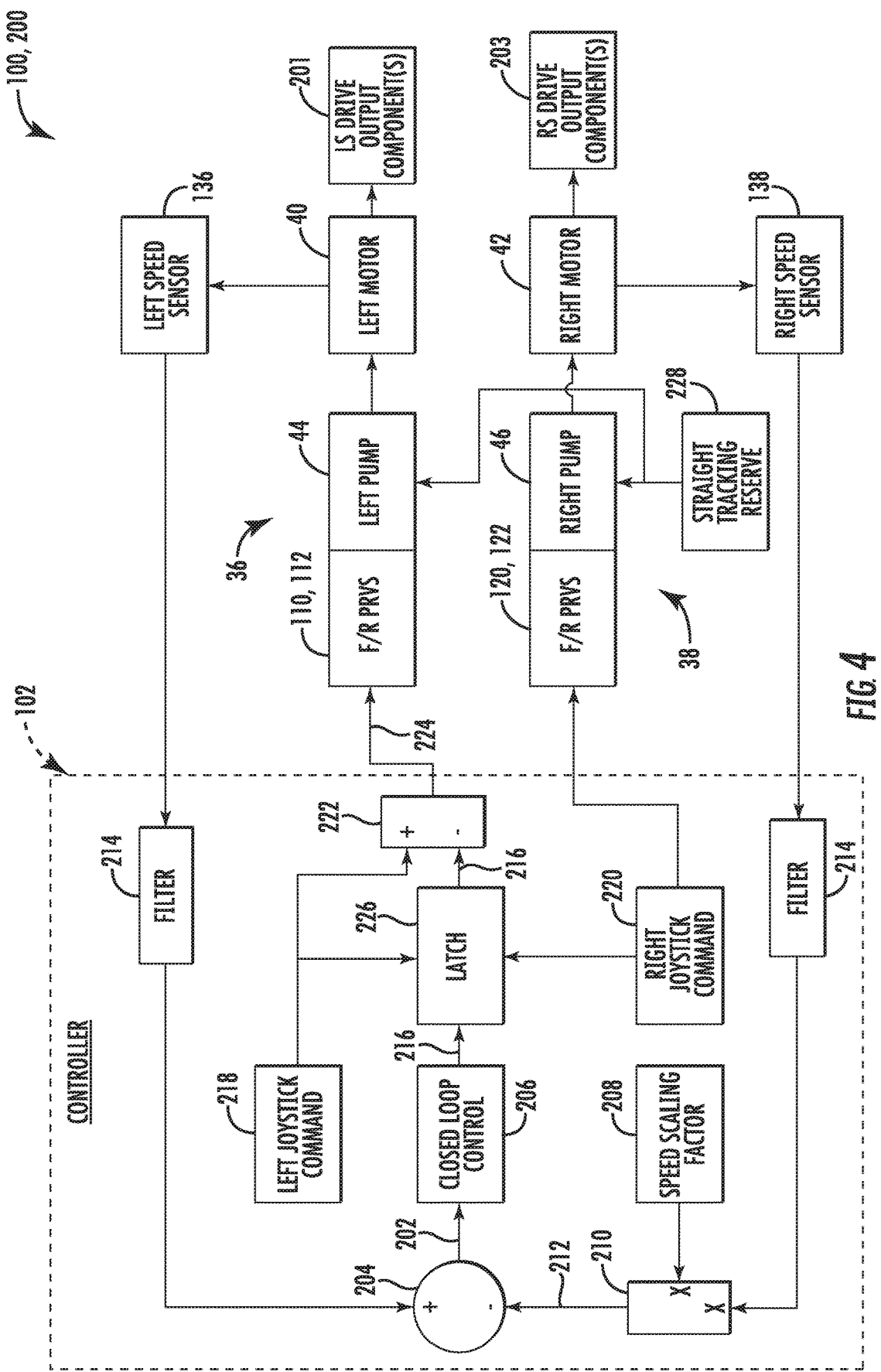
FIG. 4 illustrates a schematic view of a specific implementation of the control system described above with reference to FIG. 3 in accordance with aspects of the present subject matter, particularly illustrating an exemplary embodiment of the system configured as a straight tracking control system for electronically controlling the operation of the vehicle's hydrostatic transmission when the operator has commanded that the work vehicle be driven along a straight path.

Referring now to FIG. 4, a schematic view of a specific implementation of the control system 100 described above with reference to FIG. 3 is illustrated in accordance with aspects of the present subject matter, particularly illustrating an exemplary embodiment of the system 100 configured as a straight tracking control system 200 for electronically controlling the operation of the vehicle's hydrostatic transmission 28 when the operator has commanded that the work vehicle 10 be driven along a straight path. It should be appreciated that, although aspects of the embodiment of the straight tracking control system 200 shown in FIG. 4 will be described as being implemented by or forming part of the controller 102 described above with reference to FIG. 4, such aspects may, instead, by implemented by or form part of a separate controller or control module that may be communicatively coupled to controller 102 (e.g., as part of distributed computing system or network) or that is configured as a "stand-alone" control system or sub-system.

In general, the control system 200 may be used to provide pump commands (e.g., in the form of current commands or signals) to the forward and reverse PRVs 110, 112, 120, 122 used to control the displacement of both the left and right hydraulic pumps 44, 46 of the hydrostatic transmission 28. As indicated above, the left pump 44 may be configured to provide power to the left hydraulic motor 40, which, in turn, drives the left-side drive output component(s) 201 of the left-side drive system 36 (e.g., the left-side wheels/tires of a wheeled vehicle or the left-side drive wheel/track of a tracked vehicle). Similarly, the right pump 46 may be configured to provide power to the right hydraulic motor 42, which, in turn, drives the right-side drive output component(s) 203 of the right-side drive system 38 (e.g., the left-side wheels/tires of a wheeled vehicle or the left-side drive wheel/track of a tracked vehicle). Moreover, the left-side and right-side speed sensors 136, 138 may be utilized to monitor the output speed of the left and right hydraulic motors 40, 42, respectively, as each motor 40, 42 is being operated to rotationally drive its associated drive output component(s) 201, 203. It should be appreciated that, in addition to the speed sensors 136, 138 (or an alternative thereto), the system may also include suitable speed sensors for monitoring the rotational speed of the drive output components 201, 203 of each drive system 36, 38, such as speed sensors configured to monitor the rotational speed of the left-side wheels 12, 16 and the right-side wheels 12, 18 of the work vehicle 10 (or the left-side drive wheel and the right-side drive wheel of a tracked vehicle).

In general, the speed signals from the left-side and right-side speed sensors 136, 138 may be utilized to calculate a speed error 202 between the left-side and right-side drive systems 36, 38 (e.g., at the subtractor block 204 shown in FIG. 4) that is used as feedback into a closed-loop control algorithm 206. However, prior to calculating the speed error 202, the speed signal(s) output from either the left-side speed sensor 136 or the right-side speed sensor 138 may be modified by a speed scaling factor 208. For example, as shown in the illustrated embodiment, the right speed signal(s) from the right-side speed sensor 138 may be modified by the speed scaling factor 208 (e.g., at multiplier block 210) to generate a modified or corrected right speed signal (indicated by arrow 212 in FIG. 4). The corrected right speed signal 212 may then be input into the subtractor block 204 together with the left speed signal to calculate the speed error 202 between the speed signals. It should be appreciated that, in one embodiment, each speed signal may be filtered (e.g., via filters 214) as an initial processing step prior to being modified by the speed scaling factor 208 and/or prior to being used to calculate the speed error 202.

As will be described in greater detail below, the speed scaling factor 208 may generally correspond to a speed modifier that is calculated or selected to allow either the left-side speed signals or the right-side speed signals to be adjusted in a manner that accounts for differences between the left-side and right-side drive systems 36, 38 that may otherwise result in the vehicle 10 veering to the left or right when straight travel is commanded, such as manufacturing tolerances for the vehicle's tires, differing tire pressures, misalignment between the wheel assemblies, load imbalances, etc. Specifically, the speed scaling factor 208 may be used to scale-up or scale-down the associated speed signal(s), as needed, such that the final pump commands provided to the associated PRVs 110, 112, 120, 122 of the hydraulic pumps 44, 46 result in straight travel of the work vehicle 10. For example, if the work vehicle 10 is veering to the right when the vehicle 10 is commanded to travel straight due to the right-side tires having a smaller tire diameter than the left-side tires (e.g., due to tire manufacturing tolerances or due to differing tire pressures), the speed scaling factor 208 may be selected to decrease the right-side speed signal (e.g., by selecting a speed scaling factor 208 that is less than one) such that the speed error 202 being input into the closed-loop control algorithm 206 is similarly adjusted, which may, in turn, result in the pump command to the left pump 44 being adjusted (e.g., decreased) in a manner that accounts for the differing tire diameters.

Additionally, as will be described below, the speed scaling factor 208 may, in several embodiments, be calculated automatically by the controller 102 and/or set manually by the operator. For example, in one embodiment, the controller 102 may be configured to execute aspects of a calibration routine that allows for a speed scaling factor 208 to be calculated as the work vehicle 10 is being driven along a straight path. In another embodiment, the operator may be allowed to provide manual inputs (e.g., incremental adjustments) to account for any left or right veering of the work vehicle 10 when the operator has commanded straight travel. It should also be appreciated that the speed scaling factor 208 may be adjusted, as is desired or necessary, to account for changing wheel alignment/misalignment, changing tire diameters, and/or the like. For instance, when the work vehicle 10 is being initially operated for the very first time, the speed scaling factor 208 may be set (e.g., via execution of an appropriate calibration routine and/or via manual inputs from the operator) so as to allow the work vehicle 10 to track straight when so commanded. Thereafter, if the work vehicle 10 subsequently begins to veer left or right due to a change in a parameter associated with one of the drive systems 36, 38, the speed scaling factor 208 may be re-calculated or adjusted (e.g., via re-executing the calibration routine or via manual inputs from the operator) to provide for straight tracking.

As indicated above, the speed error 202 calculated based on the speed signals (e.g., at subtractor block 204) may be input into a closed-loop control algorithm 206 for generating a control output (indicated by arrows 216 in FIG. 4) for adjusting one or both of the joystick commands received from the operator (e.g., left joystick command 218 and right joystick command 220 shown in FIG. 4). In one embodiment, the controller 202 may be configured as or may include a closed-loop controller (e.g., a Proportional-Integral (PI) controller) that executes one or more closed-loop control algorithms 206 for generating or calculating an appropriate control output 216 based on the speed error 202. In one embodiment, the control gains applied within the closed-loop control algorithm 206 may be dependent on one or more parameters of the work vehicle 10, such as the temperature of the hydraulic fluid being supplied to the pumps 44, 45. As is generally understood, the control gains may be stored within the controller's memory 106 so to be readily accessible by the controller 102. For example, in one embodiment, the control gains may be stored in the form of a look-up table or mathematical expression that correlates the gain values to the speed error 202 and/or the relevant operating parameters of the work vehicle 10 (e.g., hydraulic fluid temperature).

In general, the control output 216 from the closed-loop control algorithm 206 may be utilized to modify one of the joystick commands 218, 220 received from the operator. For instance, in the illustrated embodiment, the control output 216 is use to modify the left joystick command 218 (e.g., at subtractor block 222), with the resultant adjusted control command (indicated by arrow 224 in FIG. 4) being provided to the appropriate PRV 110, 112 of the left hydraulic pump 44 as a final pump command. In such an embodiment, the right joystick command 220 received from the operator may correspond to an open loop command and, thus, may be provided directly to the appropriate PRV 120, 122 of the right hydraulic pump 46 as a final pump command. However, it should be appreciated that, in other embodiments, the control output 216 may be used to modify the right joystick command 220. For instance, as will be described below with reference to FIG. 5, the specific joystick command 218, 220 to which the control output 216 is applied may, in one embodiment, vary depending on whether the control output 216 is a positive value or a negative value. In addition, as will be described below with reference to FIG. 5, the control output 216 may, in one embodiment, be added to or subtracted from the appropriate joystick command 218, 220 depending on the commanded direction of travel (e.g., forward or reverse).

Moreover, as shown in FIG. 4, in one embodiment, the control output 216 from the closed-loop control algorithm 206 may optionally be input into a latch 226 or other memory element of the controller's memory 106. In such an embodiment, the latch 226 may be configured to store or freeze the control output 216 from the closed-loop control algorithm 206 when the operator commands that the vehicle 10 be turned (and, thus, ceases to command straight travel). Specifically, at the initiation of a turn by the operator, the latch 226 may store or freeze the last control output 216 received from the closed-loop control algorithm 206 until after the turn has been completed, with the latched control output value being applied during the turn. In such instance, when the operator subsequently commands straight travel of the work vehicle 10, the stored control output 216 may continue to be utilized as the current control output 216 for modifying the relevant joystick command (e.g., at second subtractor block 222). After a short time delay following the re-initiation of straight travel, the control output 216 may then be unlatched or unfrozen and new control outputs from the closed-loop control algorithm 206 may be used to modify the relevant joystick command. Similarly, as long as the operator continues to command straight travel, the latch 226 will not store or freeze the control output 216 (i.e., the input to the latch 226 and the output of the latch 226 will be the same value) and, thus, the current control output 216 from the closed-loop control algorithm 206 will be used to modify the relevant joystick command.

It should be appreciated that, in one embodiment, prior to utilizing the control output 216 to modify one of the joystick commands 218, 220 received from the operator, the control output 216 may be scaled by the magnitude of the associated joystick command(s) 218, 220 so that small (or zero) commands from the operator result in small (or zero) control outputs being applied thereto. As such, if a large value is latched while the vehicle is turning (e.g., when the vehicle was traveling at a high speed prior to the initiation of a turn) and the operator then commands a low speed as the vehicle as he/she resumes straight travel, the latched value can be scaled down appropriately.

Additionally, as shown in FIG. 4, in one embodiment, a straight tracking reserve 228 may be used to provide additional flow to the left and right pumps 44, 46, as needed, during execution of straight tracking control to ensure that the work vehicle 10 can maintain a straight path. For instance, in one embodiment, the straight tracking reserve 228 can be used to provide additional fluid to one of the pumps (e.g., the left pump 44) to avoid saturation of the pump flow when such pump receives a command signal from the straight tracking control algorithm to operate at a speed greater than the maximum speed of the machine. In another embodiment, the straight tracking reserve 228 may be used to provide additional flow to the motors 40, 42 by increasing pump displacement beyond the nominal maximum pump displacement during maximum vehicle speed while not executing a turning operation.

Figure 5:
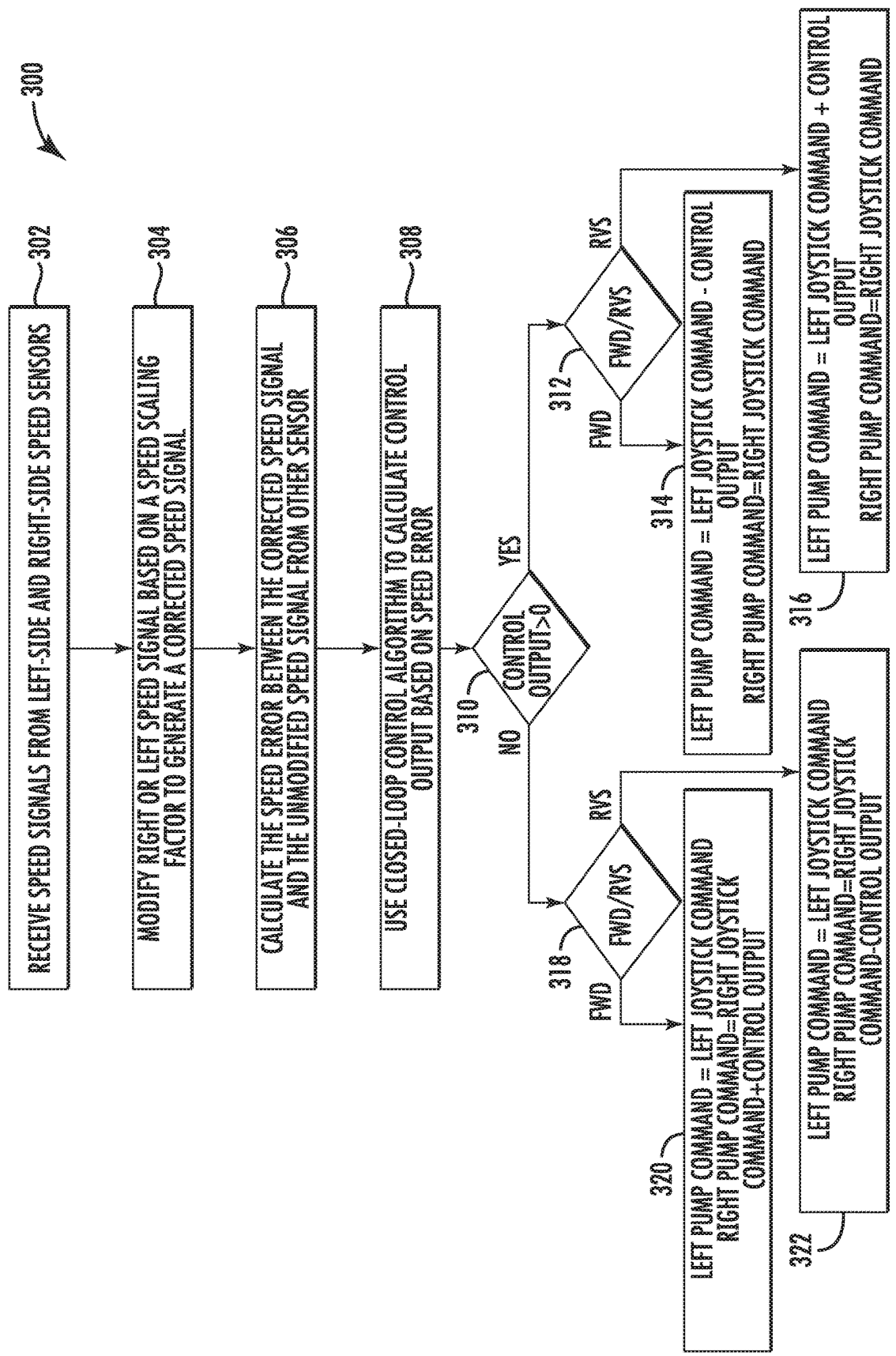
FIG. 5 illustrates a flow diagram providing control logic for executing one embodiment of the straight tracking control described above with reference to FIG. 4 in accordance with aspects of the present subject matter.

Referring now to FIG. 5, a flow diagram providing control logic 300 for executing one embodiment of the straight tracking control described above with reference to FIG. 4 is illustrated in accordance with aspects of the present subject matter. Specifically, FIG. 5 illustrates an exemplary process flow when executing straight tracking control that varies the joystick command to which the control output is being applied based on the sign of the control output and also varies the specific application of the control output (e.g., as an added value or a subtracted value) based on the commanded direction of travel of the work vehicle (e.g., forward or reverse). It should be appreciated that, for purposes of discussion, the control logic 300 shown in FIG. 5 will be described herein as being executed by the controller 102 described above with reference to FIG. 4 and in association with the straight tracking control system 200 described above with reference to FIG. 4. However, in other embodiments, the control logic 300 may be executed by any suitable processor-based device, such as a separate controller or control module that may be communicatively coupled to the controller 102 (e.g., as part of distributed computing system or network) or that is configured as a "stand-alone" control system or sub-system, and/or may be executed in association with any other suitable straight tracking control system.

As shown in FIG. 5, at (302), the controller 102 may be configured to receive the speed signals from the left-side and right-side speed sensors 136, 138. As indicated above with reference to FIG. 4, as an initial processing step, the controller 102 may filter one or both of the speed signals (e.g., via filters 214). Additionally, at (304), the controller 102 may be configured to modify one of the speed signals based on an associated speed scaling factor stored within the controller's memory to generate a corrected speed signal. For instance, as described above with reference to FIG. 4, in one embodiment, the right speed signal may be modified using the speed scaling factor 208 (e.g., as a multiplier) to generate a corrected right speed signal 212. In such an embodiment, the left speed signal may remain unmodified (except for any adjustments made during filtering). However, in an alternative embodiment, the left speed signal may be modified using the speed scaling factor (e.g., as a multiplier) to generate a corrected left speed signal. In such an embodiment, the right speed signal may remain unmodified (except for any adjustments made during filtering).

Moreover, as shown in FIG. 5, at (306), the controller 102 may be configured to calculate a speed error (e.g., speed error 202 of FIG. 4) between the corrected speed signal and the unmodified speed signal received from the other speed sensor. For instance, when the speed scaling factor is being applied to the right speed signal, the speed error may be equal to the difference between the left speed signal (e.g., as received from the left-side speed sensor with or without filtering) and the corrected right speed signal. Similarly, when the speed scaling factor is being applied to the left speed signal, the speed error may be equal to the difference between the corrected left speed signal and the right speed signal (e.g., as received from the right-side speed sensor with or without filtering).

Upon calculation of the speed error, at (308), the controller 102 may be configured to execute a closed-loop control algorithm (e.g., control algorithm 206 of FIG. 4) to calculate a control output based on the speed error. Thereafter, at (310), a determination may be made as to whether the control output from the closed-loop control algorithm corresponds to a positive value or a negative value. Specifically, if the control output is greater than zero (i.e., a positive value), the controller 102 may be configured to apply the control output to the left joystick command. However, if the control output is less than zero (i.e., a negative value), the controller 102 may be configured to apply the control output to the right joystick command.

As shown in FIG. 5, in the event that the control output is a positive value, the controller may, at (312), determine whether the operator is currently commanding forward travel or reverse travel. If the operator is commanding forward travel, the control output may be subtracted from the left joystick command to calculate the final pump command for the left hydraulic pump 44 while the final pump command for the right hydraulic pump 46 may correspond to the open-loop, right joystick command (e.g., as indicated by box (314) in FIG. 5). In contrast, if the operator is commanding reverse travel, the control output may be added to the left joystick command to calculate the final pump command for the left hydraulic pump 44 while the final pump command for the right hydraulic pump 46 may correspond to the open-loop, right joystick command (e.g., as indicated by box (316) in FIG. 5).

Moreover, as shown in FIG. 5, in the event that the control output is a negative value, the controller 102 may, at (318), determine whether the operator is currently commanding forward travel or reverse travel. If the operator is commanding forward travel, the control output may be added to the right joystick command to calculate the final pump command for the right hydraulic pump 46 while the final pump command for the left hydraulic pump 44 may correspond to the open-loop, left joystick command (e.g., as indicated by box (320) in FIG. 5). In contrast, if the operator is commanding reverse travel, the control output may be subtracted from the right joystick command to calculate the final pump command for the right hydraulic pump 46 while the final pump command for the left hydraulic pump 44 may correspond to the open-loop, left joystick command (e.g., as indicated by box (322) in FIG. 5).

It should be appreciated that the control logic 300 shown in FIG. 5 simply provides one example of suitable logic for executing straight tracking control in accordance with aspects of the present subject matter. For instance, the control logic 300 of FIG. 5 is based on certain assumptions associated with the operating and/or control parameters of the system, such as the range of values associated with the joystick commands and/or the sign of the speed signals. Thus, one of ordinary skill in the art would readily appreciate that the associated control logic may vary using different assumptions.

As indicated above, the speed scaling factor used to modify the right or left speed signals may generally correspond to a speed modifier or scaling value that is selected or set to account for any differences between the left-side and right-side drive systems 36, 38 that may otherwise result in a work vehicle veering to the left or right when straight travel is commanded, such as manufacturing tolerances for the vehicle's tires, differing tire pressures, misalignments between the wheel assemblies, load imbalances, etc. For example, in several embodiments, the controller 102 may be configured to execute aspects of a calibration routine to calculate an appropriate speed scaling factor for ensuring straight travel of the work vehicle when so commanded by the operator. In doing so, the controller 102 may be configured to analyze the speed signals received from the left-side and right-side speed sensors 136, 138 as the work vehicle 10 is actually being driven along a straight path to calculate the speed scaling factor to be used when executing straight tracking control.

Figure 6:
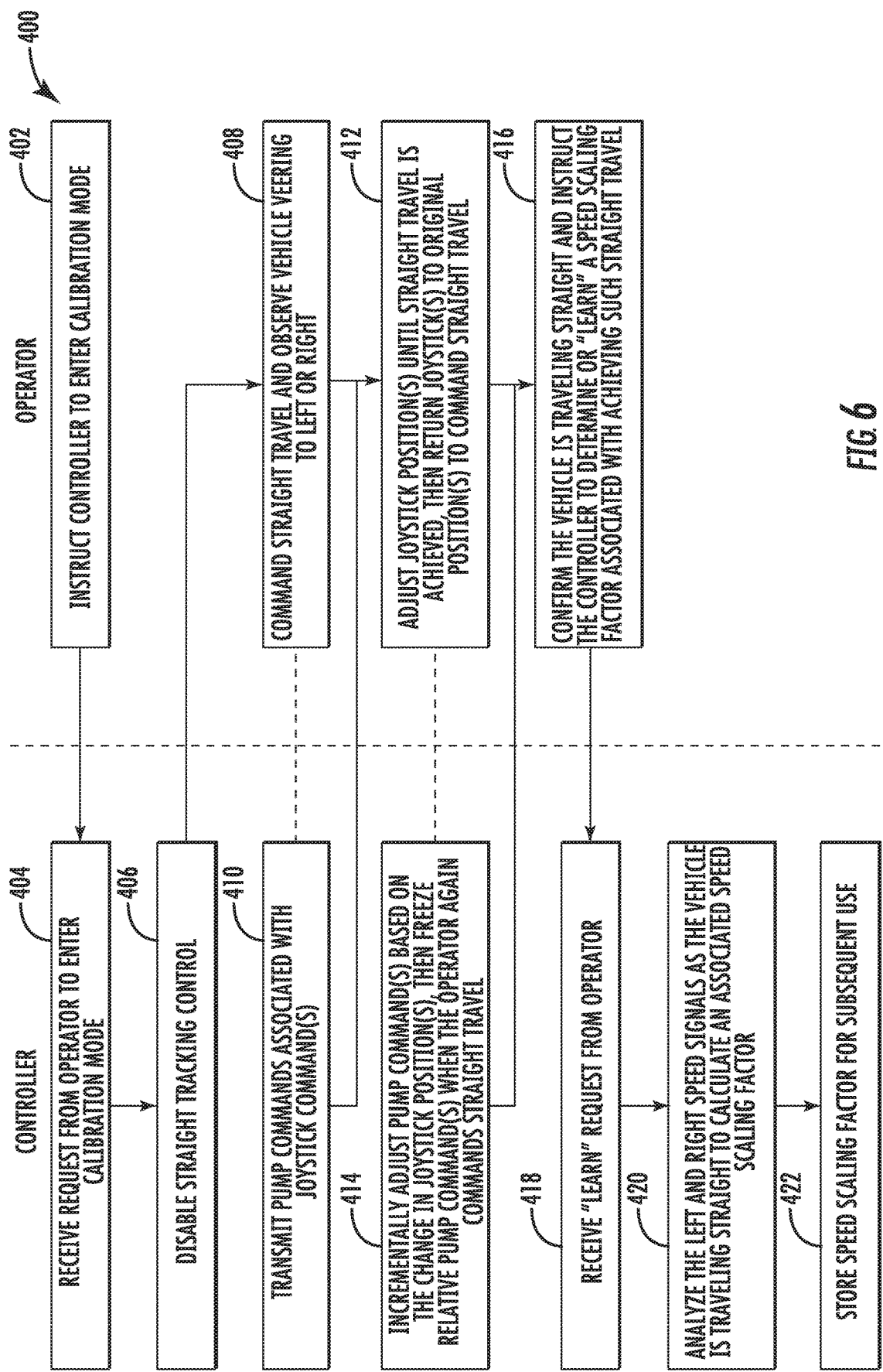
FIG. 6 illustrates a flow diagram of one embodiment of a methodology for executing a calibration routine to calculate a speed scaling factor for use during straight tracking control of a work vehicle in accordance with aspects of the present subject matter.

For example, FIG. 6 illustrates a flow diagram of one embodiment of a methodology for executing a calibration routine 400 to calculate a speed scaling factor for use during straight tracking control of a work vehicle in accordance with aspects of the present subject matter. As shown, the flow diagram includes both steps performed by the operator (e.g., along the right-side column of FIG. 6) and processing steps performed by the controller 102 (e.g., along the left-side column of FIG. 6) for executing the calibration routine 400.

As shown in FIG. 6, at (402), the operator may instruct the controller 102 to enter into a calibration mode (e.g., via a suitable input device, such as an input device located or accessible within the vehicle's cab and/or via an auxiliary input device (e.g., a separate service tool)). For example, the operator may be initially setting-up the machine and may be required to run the calibration routine to calibrate the vehicle's straight tracking control system. Alternatively, the operator may have noticed that the vehicle is not tracking straight and, thus, may desire to re-calibrate the system. As another example, the operator may correspond to a service technician that desires to perform the calibration routine following the performance of a service or maintenance activity (e.g., following the replacement of the vehicle tires and/or the replacement of one of the other drive system components, such as one or both of the vehicle's hydraulic pumps and/or motors).

At (404), the controller 102 may receive the operator's request.

Thereafter, upon receipt of the request, the controller may, at (406), disable its straight tracking control system. For example, the controller 102 may disable the closed-loop control algorithm described above with reference to FIG. 4 such that the speed feedback signals received from the left-side and right-side speed sensors 136, 138 are not considered. Rather, during the calibration sequence, the controller 102 may be configured to simply implement open-loop control based on the joystick commands received from the operator.

As shown in FIG. 6, at (408), the operator may then command straight travel of the work vehicle 10 and observe whether the vehicle 10 is veering to the left or right. As indicated above, to command straight travel when using separate left and right joysticks, the operator may actuate or move both joysticks to the same position relative to their neutral position to provide equal inputs to the controller 102, such as by moving both joysticks to command 50% of the maximum speed for both the left-side and right-side drive systems 36, 38. Alternatively, when using a single joystick, the operator may push the joystick straight forward to command straight travel in the forward direction. In response such user input command(s), the controller 102 may, at (410), be configured to transmit corresponding pump commands to the left and right pumps 44, 46 for controlling the operation of the left-side and right-side drive systems 36, 38. For example, if the joystick command(s) received from the operator is associated with driving the work vehicle 10 straight in the forward direction at 40% of its maximum speed, the controller 102 may transmit suitable current commands to the associated PRVs 110, 120 of the pumps 44, 46 for achieving the commanded speed. In one embodiment, the controller 102 may be configured to limit the speed of the work vehicle 10 during the performance of the calibration routine (e.g., to 50% of the maximum speed), in which case the controller 102 may scale the pump commands associated with each joystick command(s) based on the speed limit. Thereafter, as the hydrostatic transmission 28 is being controlled based on the joystick command(s), the operator can view the travel path of the work vehicle 10 to determine if the vehicle 10 veers to the left or to the right. In the event the work vehicle travels 10 straight as commanded, the calibration routine may be exited or aborted.

However, if the operator observes the work vehicle 10 veering to the left or right, the operator may, at (412), adjust the joystick position(s) in the direction of the required travel correction. For instance, to correct for veering to the left when using separate left and right joysticks, the operator may increase the left joystick command and/or reduce the right joystick command. Similarly, to correct for veering to the left when using a single joystick, the operator may move the joystick to the right to counteract such veering. As long as the operator holds the joystick(s) at its adjusted position(s), the controller 102 may, at (414), be configured to incrementally adjust one or both of the pump commands to achieve the requesting travel correction, such as by incrementally increasing or decreasing the pump command to one side or by incrementally increasing the pump command to one side while incrementally decreasing the pump command to the other side. As a result, while the operator holds the joystick(s) at the adjusted position, the controller 102 may slowly or incrementally adjust the travel direction of the work vehicle 10 in the direction requested by the operator. Once the operator observes that the work vehicle 10 is traveling straight, the operator may move the joystick(s) back to the original position to which it was initially when commanding straight travel. Such movement of the joystick(s) back to the original straight travel position may trigger the controller 102 to stop further incremental adjustments of the pump command(s) and freeze or lock the relative pump command(s) at such point to allow the vehicle 10 to continue to be driven straight.

Following the relative left and right pump commands being frozen, the operator may again view the travel path of the work vehicle 10 and confirm that it is actually traveling straight. Thereafter, at (416), assuming the vehicle is traveling straight, the operator may instruct the controller 102 to determine or "learn" a corresponding speed scaling factor associated with achieving such straight travel. As shown in FIG. 6, at (418), the controller 102 may receive the operator's "learn" request and may subsequently, at (420), begin to analyze the speed signals received from the speed sensors 136, 138 as the work vehicle 10 is traveling straight to calculate an associated speed scaling factor. Specifically, in one embodiment, the controller 102 may be configured to calculate a speed ratio between the left speed signal and the right speed signal (or between the right speed signal and the left speed signal—depending on which speed signal the scaling factor is to be applied) as the work vehicle 10 is traveling straight. In such an embodiment, the speed ratio may then be set as the speed scaling factor, which may then be stored within the controller's memory (e.g., at (422)) for subsequent use during execution of the straight tracking control system. Alternatively, the controller 102 may be configured to integrate the left and right output speeds associated with the speed signals received from the speed sensors 136, 138 over a predetermined time period to determine the total wheel travel for both the left-side and right-side wheels across such time period as the work vehicle is traveling straight. In such an embodiment, the controller 102 may be configured to calculate a wheel travel ratio between the left-side wheel travel and the right-side wheel travel (or between the right-side wheel travel and the left-side wheel travel—depending on which speed signal the scaling factor is to be applied). The wheel travel ratio may then be set as the speed scaling factor and stored within the controller's memory (e.g., at (422)) for subsequent use.

Figure 7:
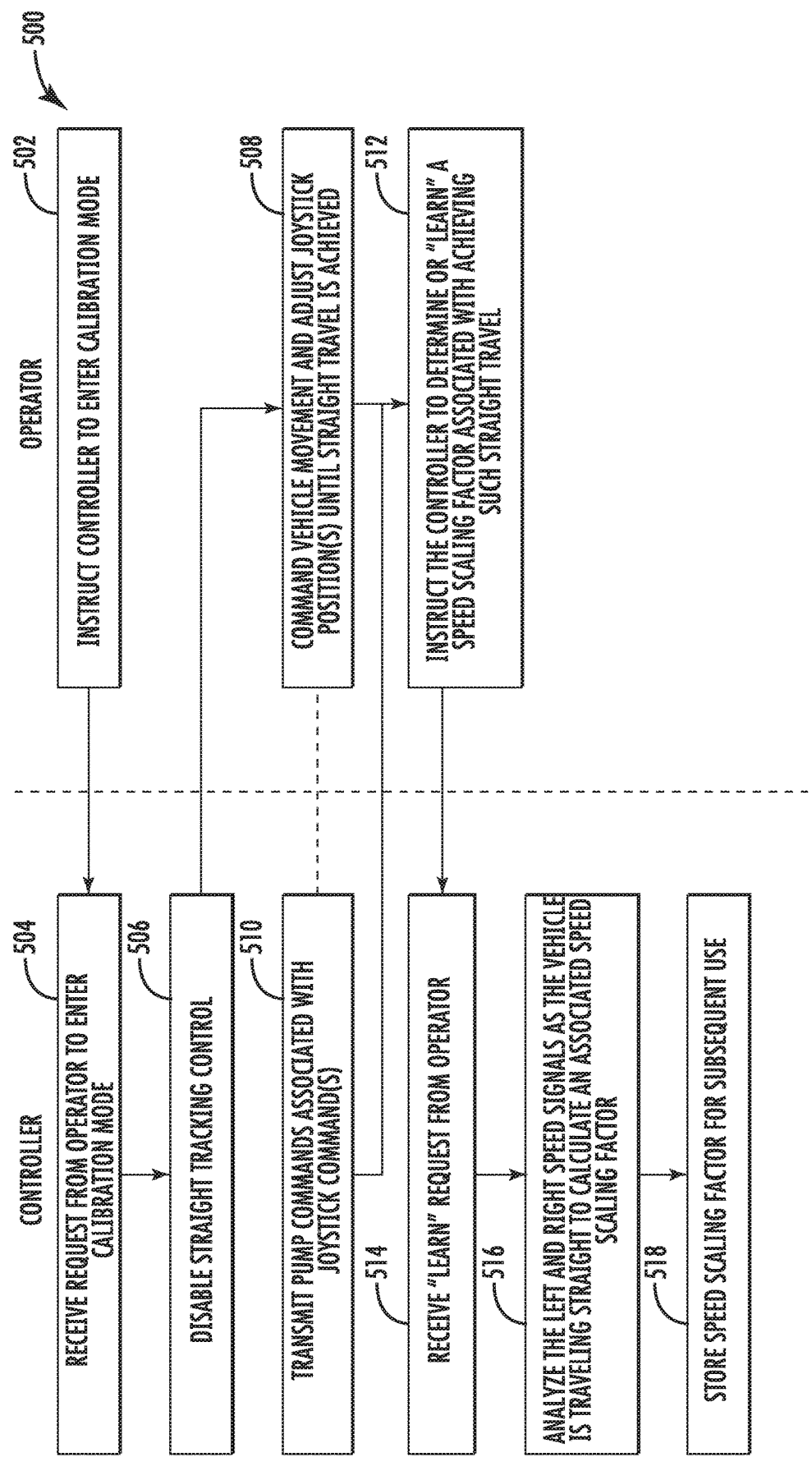
FIG. 7 illustrates a flow diagram of another embodiment of a methodology for executing a calibration routine to calculate a speed scaling factor for use during straight tracking control of a work vehicle in accordance with aspects of the present subject matter.

Referring now to FIG. 7, a flow diagram of another embodiment of a methodology for executing a calibration routine 500 to calculate a speed scaling factor for use during straight tracking control of a work vehicle is illustrated in accordance with aspects of the present subject matter. As shown, the flow diagram includes both steps performed by the operator (e.g., along the right-side column of FIG. 7) and processing steps performed by the controller 102 (e.g., along the left-side column of FIG. 7) for executing the calibration routine 500.

As shown in FIG. 7, at (502), the operator may instruct the controller 102 to enter into a calibration mode (e.g., via a suitable input device, such as an input device located or accessible within the vehicle's cab and/or via an auxiliary input device (e.g., a separate service tool)). Thereafter, similar to the calibration routine 400 described above with reference to FIG. 6, the controller 102 may, at (504) and (506), receive the operator's request and disable its straight tracking control system. As such, during the calibration sequence, the controller 102 may be configured to simply implement open-loop control based on the joystick commands received from the operator.

As shown in FIG. 7, at (508), the operator may then command vehicle movement and adjust the joystick position(s) until straight travel is achieved. For example, the operator may initially command straight travel of the work vehicle and observe whether the vehicle is veering to the left or right. Upon determining that the vehicle is veering to one side, the operator may adjust the joystick position(s) in the direction of the required travel correction. For instance, to correct for veering to the left when using separate left and right joysticks, the operator may increase the right joystick command and/or reduce the left joystick command. Similarly, to correct for veering to the left when using a single joystick, the operator may move the joystick to the right to counteract such veering. In response such user input command(s), the controller, at (510), may be configured to transmit corresponding pump commands to the left and right pumps for controlling the operation of the left-side and right-side drive systems. In one embodiment, the controller 102 may be configured to limit the speed of the work vehicle during the performance of the calibration routine (e.g., to 50% of the maximum speed), in which case the controller 102 may scale the pump commands associated with each joystick command(s) based on the speed limit.

Once the operator is able to get the vehicle traveling straight, the operator may, at (512), instruct the controller 102 to determine or "learn" a corresponding speed scaling factor associated with achieving such straight travel. As shown in FIG. 7, at (514), the controller 102 may receive the operator's "learn" request and may subsequently, at (516), begin to analyze the speed signals received from the speed sensors 136, 138 as the work vehicle is traveling straight to calculate an associated speed scaling factor. Specifically, as indicated above, the controller 102 may, for example, be configured to set the speed scaling factor as the speed ratio between the left speed signal and the right speed signal (or between the right speed signal and the left speed signal—depending on which speed signal the scaling factor is to be applied) as the work vehicle is traveling straight. Alternatively, the controller 102 may be configured to set the speed scaling factor as the wheel travel ratio between the left-side wheel travel and the right-side wheel travel (or between the right-side wheel travel and the left-side wheel travel—depending on which speed signal the scaling factor is to be applied) determined based on integrating the left and right wheels speeds over a predetermined time period as the vehicle is traveling straight. Regardless, once the speed scaling factor has been calculated, the controller 102 may be configured to store the scaling factor within its memory (e.g., at (518)) for subsequent use.

Figure 8:
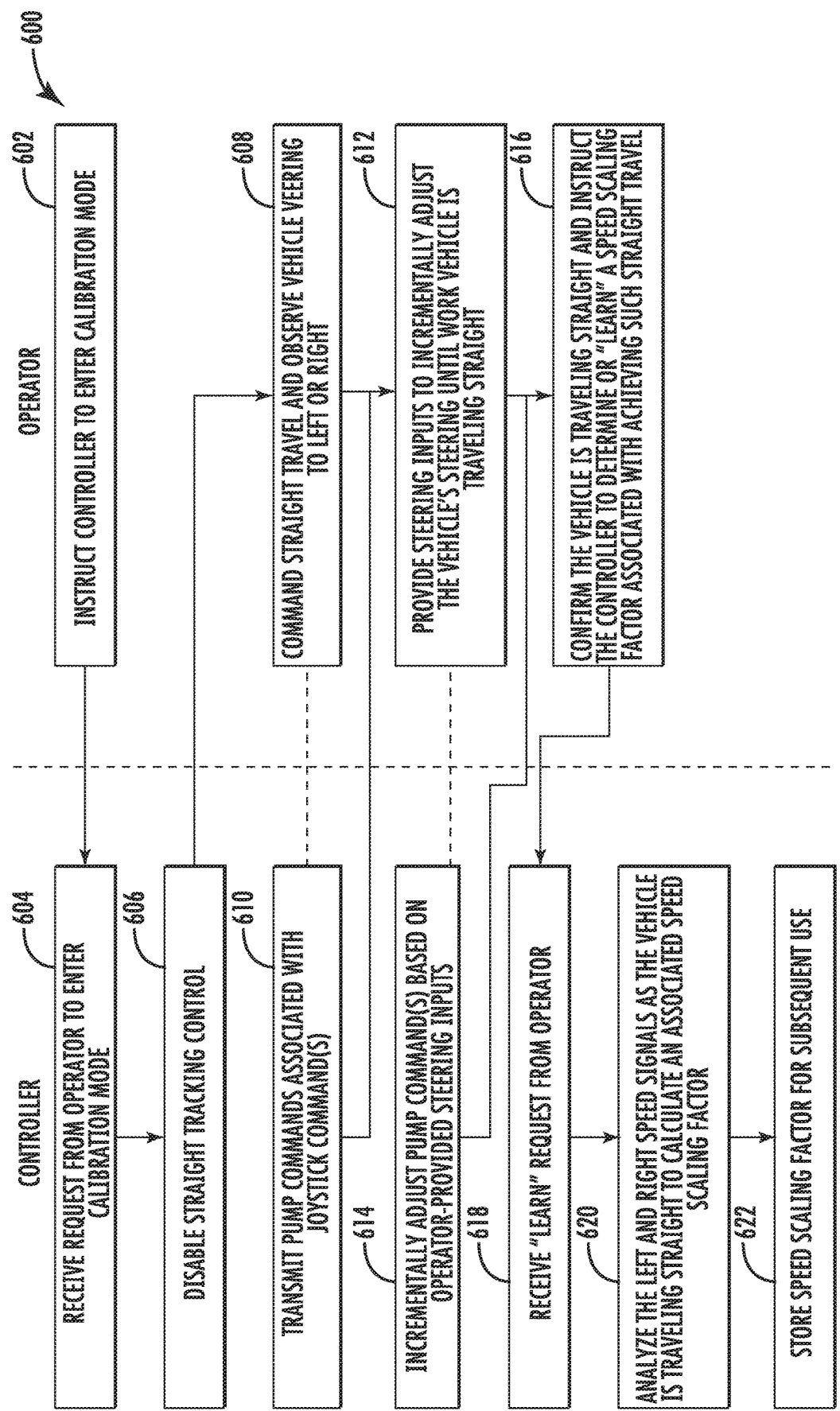
FIG. 8 illustrates a flow diagram of a further embodiment of a methodology for executing a calibration routine to calculate a speed scaling factor for use during straight tracking control of a work vehicle in accordance with aspects of the present subject matter.

Referring now to FIG. 8, a flow diagram of a further embodiment of a methodology for executing a calibration routine 600 to calculate a speed scaling factor for use during straight tracking control of a work vehicle is illustrated in accordance with aspects of the present subject matter. As shown, the flow diagram includes both steps performed by the operator (e.g., along the right-side column of FIG. 8) and processing steps performed by the controller 102 (e.g., along the left-side column of FIG. 8) for executing the calibration routine 600.

As shown in FIG. 8, at (602), the operator may instruct the controller 102 to enter into a calibration mode (e.g., via a suitable input device, such as an input device located or accessible within the vehicle's cab and/or via an auxiliary input device (e.g., a separate service tool)). Thereafter, similar to the calibration routines 400, 500 described above with reference to FIGS. 6 and 7, the controller 102 may, at (604) and (606), receive the operator's request and disable its straight tracking control system. As such, during the calibration sequence, the controller 102 may be configured to simply implement open-loop control based on the joystick commands received from the operator.

As shown in FIG. 8, at (608), the operator may then command straight travel of the work vehicle and observe whether the vehicle is veering to the left or right. As indicated above, to command straight travel when using separate left and right joysticks, the operator may actuate or move both joysticks to the same position relative to their neutral position to provide equal inputs to the controller 102. Alternatively, when using a single joystick, the operator may push the joystick straight forward to command straight travel in the forward direction. In response such user input command(s), the controller 102 may, at (610), be configured to transmit corresponding pump commands to the left and right pumps for controlling the operation of the left-side and right-side drive systems. In one embodiment, the controller 102 may be configured to limit the speed of the work vehicle during the performance of the calibration routine (e.g., to 50% of the maximum speed), in which case the controller 102 may scale the pump commands associated with each joystick command(s) based on the speed limit. As the hydrostatic transmission 28 is being controlled based on the joystick command(s), the operator can view the travel path of the work vehicle 10 to determine if the vehicle 10 veers to the left or to the right. In the event the work vehicle travels straight as commanded, the calibration routine may be exited or aborted.

However, if the operator observes the work vehicle veering to the left or right, the operator may, at (612), provide operator inputs to incrementally adjust the vehicle's steering until the work vehicle 10 is traveling straight. Specifically, in one embodiment, the operator may be allowed to use one or more of the vehicle's input devices (e.g., separate buttons or other interface elements located with the cab) to provide steering inputs to the controller 102 in order to correct the observed left or right veering of the vehicle. For example, if the work vehicle is veering to the left as straight travel is being commanded, the operator may press an associated "right steering" button to incrementally adjust the vehicle steering to the right. In such instance, each actuation of the "right steering" button by the operator may correspond to a predetermined incremental adjustment of the joystick command(s) and/or a predetermined incremental adjustment of one or both of the left and right pump command(s). For example, in one embodiment, each steering input provided by the operator via the "right steering" button or the opposite "left steering" button may be mapped to a given percent change in the joystick command or a given percent change in the pump command, which is then applied to either increase or decrease the left pump command and/or the right pump command. Accordingly, as the operator views the travel path of the work vehicle, the operator may continue to provide steering inputs via the appropriate steering button to incrementally adjust the vehicle's steering until the vehicle is traveling along a straight path. Additionally, as shown in FIG. 8, at (614), in response to the operator providing such steering input(s), the controller 102 may be configured to incrementally adjust the left pump command and/or the right pump command to adjust the vehicle's steering left or right based on the received steering input(s).

Once the operator is satisfied that the vehicle's steering has been corrected and the work vehicle is traveling straight, the operator may, at (616), instruct the controller to determine or "learn" a corresponding speed scaling factor associated with achieving such straight travel. As shown in FIG. 8, at (618), the controller 102 may receive the operator's "learn" request and may subsequently, at (620), begin to analyze the speed signals received from the speed sensors 136, 138 as the work vehicle is traveling straight to calculate an associated speed scaling factor. Specifically, as indicated above, the controller 102 may, for example, be configured to set the speed scaling factor as the speed ratio between the left speed signal and the right speed signal (or between the right speed signal and the left speed signal—depending on which speed signal the scaling factor is to be applied) as the work vehicle is traveling straight. Alternatively, the controller 102 may be configured to set the speed scaling factor as the wheel travel ratio between the left-side wheel travel and the right-side wheel travel (or between the right-side wheel travel and the left-side wheel travel—depending on which speed signal the scaling factor is to be applied) determined based on integrating the left and right wheels speeds over a predetermined time period as the vehicle is traveling straight. Regardless, once the speed scaling factor has been calculated, the controller 102 may be configured to store the scaling factor within its memory (e.g., at (622)) for subsequent use.

As indicated above, as an alternative to executing a calibration routine to allow the controller 102 to determine the speed scaling factor, the operator may, instead, be allowed to manually adjust the speed scaling factor up or down to correct for left/right veering when straight travel is otherwise commanded. In such instance, the manual adjustments to speed scaling factor may be made at any time, such as when the work vehicle is moving or when the vehicle is stationary. Specifically, assuming that the operator has observed that the work vehicle is veering to the left or right when straight travel is commanded, the operator may be allowed to provide steering inputs (e.g., via separate "steering" buttons) that are used directly adjust the speed scaling factor, with each steering input being associated with a corresponding incremental adjustment of the speed scaling factor.

Figure 9:
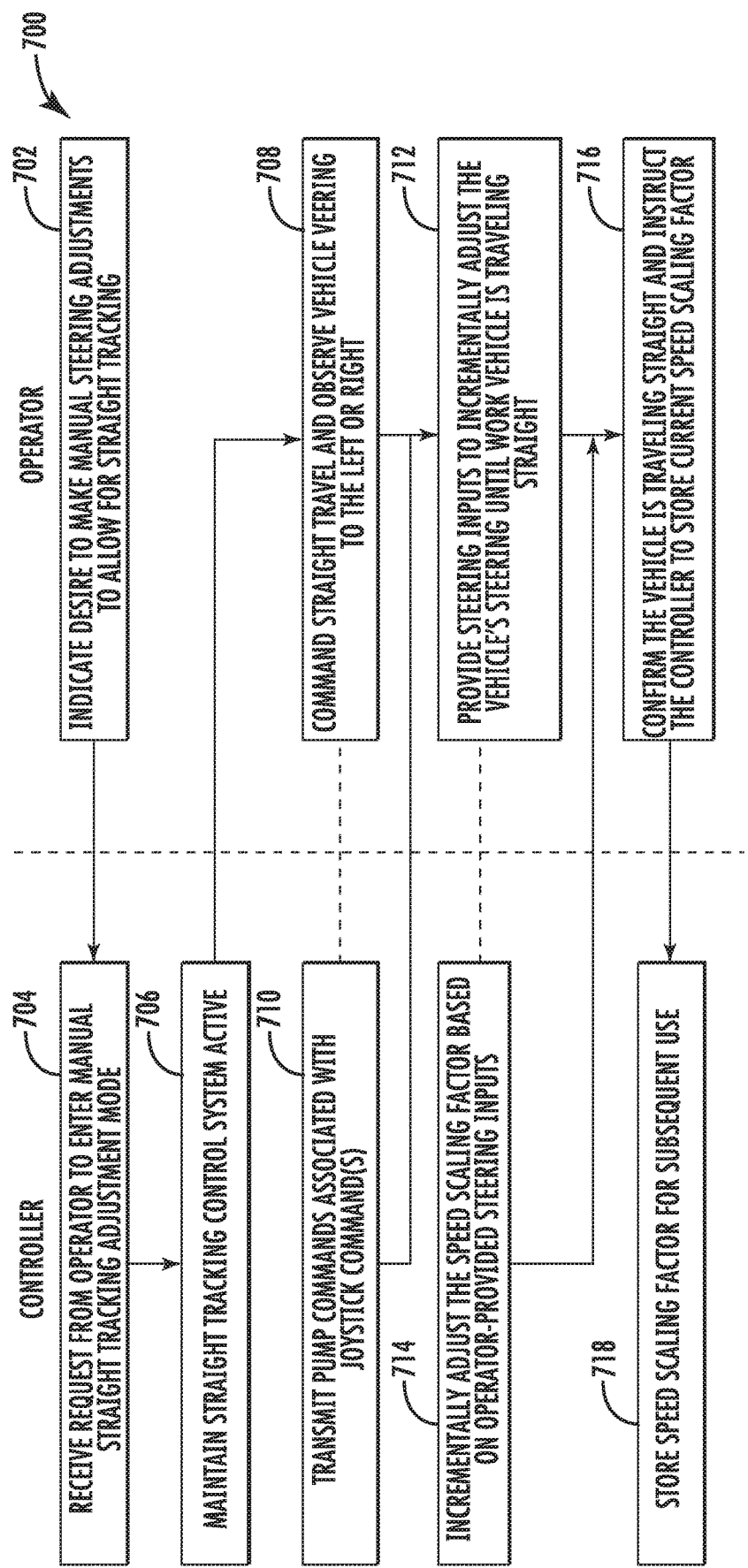
FIG. 9 illustrates a flow diagram of one embodiment of a methodology for allowing an operator to manually adjust a speed scaling factor used during straight tracking control of a work vehicle in accordance with aspects of the present subject matter.

For example, FIG. 9 illustrates a flow diagram of one embodiment of a methodology for allowing an operator to manually adjust a speed scaling factor used during straight tracking control of a work vehicle in accordance with aspects of the present subject matter. As shown, the flow diagram includes both steps performed by the operator (e.g., along the right-side column of FIG. 9) and processing steps performed by the controller 102 (e.g., along the left-side column of FIG. 9).

As shown in FIG. 9, at (702), the operator may indicate his/her desire to make manual steering adjustments to allow the work vehicle to be driven straight. For example, the operator may have observed that the work vehicle is veering to the left or right when straight travel is command and, thus, may desire to correct the vehicle's steering. In such instance, the operator may be allowed to provide a suitable input (e.g., via a button or other input device) instructing the controller 102 to enter into a manual straight tracking adjustment mode to allow manual adjustments to be made to the speed scaling factor being applied within the vehicle's straight tracking control system.

At (704), the controller 102 may receive the operator's request. Thereafter, upon receipt of the request, the controller 102 may, at (706), maintain its straight tracking control system active. Specifically, unlike the embodiments of the calibration routines 400, 500, 600 described above with reference to FIGS. 6-8, the controller 102 may be configured to continue to implementing straight tracking control during the manual straight tracking adjustment mode. As such, as the operator commands movement of the work vehicle, the controller 102 may continue to execute closed-loop control based on the feedback received from the left-side and right-side speed sensors 136, 138.

Additionally, as shown in FIG. 9, at (708), the operator may then command straight travel of the work vehicle and observe whether the vehicle is veering to the left or right. As indicated above, to command straight travel when using separate left and right joysticks, the operator may actuate or move both joysticks to the same position relative to their neutral position to provide equal inputs to the controller 102. Alternatively, when using a single joystick, the operator may push the joystick straight forward to command straight travel in the forward direction. In response such user input command(s), the controller 102, at (710), may be configured to transmit corresponding pump commands to the left and right pumps for controlling the operation of the left-side and right-side drive systems. In one embodiment, the controller 102 may be configured to limit the speed of the work vehicle during the performance of the calibration routine (e.g., to 50% of the maximum speed), in which case the controller 102 may scale the pump commands associated with each joystick command(s) based on the speed limit. As the hydrostatic transmission 28 is being controlled based on the joystick command(s), the operator can view the travel path of the work vehicle 10 to determine if the vehicle 10 veers to the left or to the right. In the event the work vehicle travels straight as commanded, the calibration routine may be exited or aborted.

However, if the operator observes the work vehicle veering to the left or right, the operator may, at (712), may provide operator inputs to incrementally adjust the vehicle's steering until the work vehicle is traveling straight. Specifically, in one embodiment, the operator may be allowed to use one or more of the vehicle's input devices (e.g., separate buttons or other interface elements located with the cab) to provide discrete steering inputs to the controller 102 in order to correct the observed left or right veering of the vehicle. For example, if the work vehicle is veering to the left as straight travel is being commanded, the operator may press an associated "right steering" button to incrementally adjust the vehicle steering to the right. In such instance, each actuation of the "right steering" button by the operator may correspond to a predetermined incremental adjustment of the speed scaling factor being applied within the vehicle's straight tracking control system. For example, in one embodiment, each steering input provided by the operator via the "right steering" button or the opposite "left steering" button may be mapped to a corresponding percent change in the speed scaling factor (e.g., a 5% or 10% change). The change in the speed scaling factor with each steering input provided by the operator may then be applied within the straight tracking control system to result in an adjustment to the speed error being input into the closed loop control algorithm, which, in turn, varies the control output being applied to the left/right joystick command so as to adjust the vehicle's steering. Accordingly, as the operator views the travel path of the work vehicle, the operator may continue to provide steering inputs via the appropriate steering button to incrementally adjust the speed scaling factor until the vehicle is traveling along a straight path. Additionally, as shown in FIG. 9, at (714), in response to the operator providing such steering input(s), the controller may be configured to incrementally adjust the speed scaling factor to adjust the vehicle's steering left or right based on the received steering input(s).

Once the operator is satisfied that the vehicle's steering has been corrected and the work vehicle is traveling straight, the operator may, at (716), instruct the controller 102 to store the current speed scaling factor. Thereafter, at (718), the controller 102 may store the speed scaling factor within its memory for subsequent use within the straight tracking control system.

Figure 10:
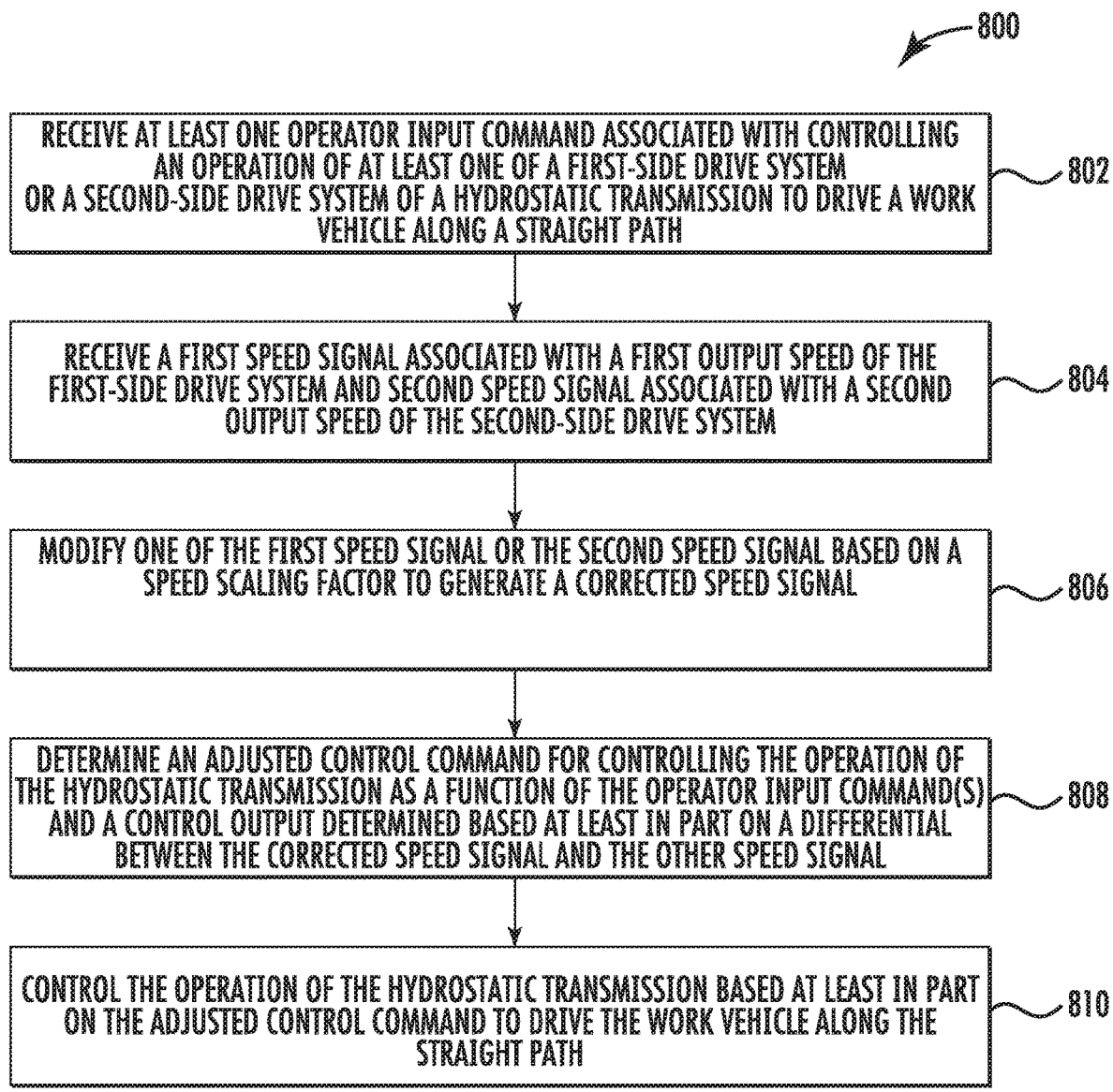
FIG. 10 illustrates a flow diagram of one embodiment of a method for executing straight tracking control of a work vehicle having an electronically controlled hydrostatic transmission in accordance with aspects of the present subject matter.

Referring now to FIG. 10, a flow diagram of one embodiment of a method 800 for executing straight tracking control of a work vehicle having an electronically controlled hydrostatic transmission is illustrated in accordance with aspects of the present subject matter. In general, the method 800 will be described with reference to the work vehicle 10 and the embodiments of the control system 100, 200 described above with reference to FIGS. 1-4. However, it should be appreciated by those of ordinary skill in the art that the disclosed method 800 may generally be utilized with any manner of work vehicle and/or associated control system. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 10, at (802), the method 800 may include receiving at least one operator input command associated with controlling an operation of at least one of a first-side drive system or a second-side drive system of a hydrostatic transmission to drive a work vehicle along a straight path. For example, as indicated above, the operator may command straight travel of the work vehicle by providing a suitable input command(s) to the vehicle's controller 102, such as a suitable joystick command(s) via separate left and right joysticks or via a single joystick.

Additionally, at (804), the method 800 may include receiving a first speed signal associated with a first output speed of the first-side drive system and a second speed signal associated with a second output speed of the second-side drive system. Specifically, as indicated above, the controller 102 may be communicatively coupled to separate left-side and right-side speed sensors 136, 138 configured to detect the output speeds associated with the first-side and second-side drive systems 36, 38, respectively.

Moreover, at (806), the method 800 may include modifying one of the first speed signal or the second speed signal based on a speed scaling factor to generate a corrected speed signal. For example, as indicated above, the controller 102 may be configured to modify the right speed signal or the left speed signal based on a speed scaling factor that is selected or set to account for any differences between the left-side and right-side drive systems 36, 38 that may otherwise result in the work vehicle veering to the left or right when straight travel is commanded, such as manufacturing tolerances for the vehicle's tires, differing tire pressures, misalignments between the wheel assemblies, load imbalances, and/or the like. Specifically, in one embodiment, the speed scaling factor may correspond to a multiplier that is directly applied to one of the speed signals to generate the corrected speed signal.

Referring still to FIG. 10, at (808), the method 800 may include determining an adjusted control command for controlling the operation of the hydrostatic transmission as a function of the at least one operator input command and a control output determined based at least in part on a differential between the corrected speed signal and the other of the first speed signal or the second speed signal. Specifically, as indicated above, the controller 102 may be configured to determine a speed error or differential between the corrected speed signal and the other, unmodified speed signal. The speed error may then be input into a closed-loop control algorithm to generate a control output that is used to modify at least one of the joystick commands received from the operator to generate an adjusted pump command for at least one of the hydraulic pumps of the vehicle's hydrostatic transmission.

Additionally, at (810), the method 800 may include controlling the operation of the hydrostatic transmission based at least in part on the adjusted control command to drive the work vehicle along the straight path. For example, as indicated above, the controller 102 may, in one embodiment, be configured to transmit the adjusted control or pump command to the PRVs associated with one of the hydraulic pumps to control the operation thereof, thereby allowing the work vehicle to be drive along a straight path.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method for executing straight tracking control of a work vehicle having an electronically controlled hydrostatic transmission, the method comprising:
    receiving, with a computing device, at least one operator input command associated with controlling an operation of the hydrostatic transmission, the at least one operator input command being associated with commanding the work vehicle to be driven along a straight path;
    generating, with the computing device, an initial control command for controlling the operation of the hydrostatic transmission in response to the at least one operator input command;
    receiving, with the computing device, at least one adjusted operator input command associated with adjusting the operation of the hydrostatic transmission to correct a deviation of the work vehicle from the straight path;
        generating, with the computing device, an adjusted control command for controlling the operation of the hydrostatic transmission in response to the at least one adjusted operator input command;
    receiving, with the computing device, an operator input providing an indication that the adjusted control command corrected the deviation of the work vehicle from the straight path;
    calculating, with the computing device, a speed scaling factor for use with a straight tracking control system of the work vehicle based at least in part on the operator input; and
    receiving an input associated with entering a calibration mode for the straight tracking control system of the work vehicle.

2. The method of claim 1, further comprising receiving a first speed signal associated with a first output speed of a first-side drive system of the hydrostatic transmission; and receiving a second speed signal associated with a second output speed of a second-side drive system of the hydrostatic transmission;
    wherein calculating the speed scaling factor as a function of the first and second speed signals as the operation of the hydrostatic transmission is being controlled based on the adjusted control command.

3. A computer-implemented method for executing straight tracking control of a work vehicle having an electronically controlled hydrostatic transmission, the method comprising:
    receiving, with a computing device, at least one operator input command associated with controlling an operation of the hydrostatic transmission, the at least one operator input command being associated with commanding the work vehicle to be driven along a straight path;
    generating, with the computing device, an initial control command for controlling the operation of the hydrostatic transmission in response to the at least one operator input command;
    receiving, with the computing device, at least one adjusted operator input command associated with adjusting the operation of the hydrostatic transmission to correct a deviation of the work vehicle from the straight path;
        generating, with the computing device, an adjusted control command for controlling the operation of the hydrostatic transmission in response to the at least one adjusted operator input command;
    receiving, with the computing device, an operator input providing an indication that the adjusted control command corrected the deviation of the work vehicle from the straight path;
    calculating, with the computing device, a speed scaling factor for use with a straight tracking control system of the work vehicle based at least in part on the operator input; and
    receiving a first speed signal associated with a first output speed of a first-side drive system of the hydrostatic transmission; and receiving a second speed signal associated with a second output speed of a second-side drive system of the hydrostatic transmission;
    wherein calculating the speed scaling factor as a function of the first and second speed signals as the operation of the hydrostatic transmission is being controlled based on the adjusted control command;
    wherein calculating the speed scaling factor comprises:
        analyzing the first speed signal over a time period as the operation of the hydrostatic transmission is being controlled based on the adjusted control command to determine a first travel value associated with the first output speed for the first-side drive system;
        analyzing the second speed signal over the time period as the operation of the hydrostatic transmission is being controlled based on the adjusted control command to determine a second travel value associated with the second output speed for the second-side drive system; and calculating a travel ratio based on the first and second travel values, the travel ratio corresponding to the speed scaling factor.

4. The method of claim 2, wherein calculating the speed scaling factor comprises calculating a speed ratio based on the first and second speed signals as the operation of the hydrostatic transmission is being controlled based on the adjusted control command, the speed ratio corresponding to the speed scaling factor.

5. The method of claim 2, wherein the speed scaling factor is used within the straight tracking control system to modify one of the first speed signal or the second speed signal.

6. The method of claim 1, further comprising disabling the straight tracking control system of the work vehicle in response to receipt of the input associated with entering the calibration mode.

7. The method of claim 6, wherein disabling the straight tracking control system comprises disabling a closed-loop control algorithm used to generate a control output for controlling the operation of the hydrostatic transmission.

8. The method of claim 1, wherein generating the adjusted control command comprises incrementally adjusting the initial control command in response to the at least one adjusted operator input command.

9. The method of claim 8, wherein the at least one adjusted operator input command comprises a steering command intended to correct the deviation of the work vehicle from the straight path.

10. The method of claim 8, wherein the at least one adjusted operator input command is associated with a change in a current position of an input device of the work vehicle, and wherein incrementally adjusting the initial control command comprises incrementally adjusting the initial control command towards a control command associated with the current position of the input device.

11. A computer-implemented method for executing straight tracking control of a work vehicle having an electronically controlled hydrostatic transmission, the method comprising:

receiving, with a computing device, at least one operator input command associated with controlling an operation of the hydrostatic transmission, the at least one operator input command being associated with commanding the work vehicle to be driven along a straight path;

generating, with the computing device, an initial control command for controlling the operation of the hydrostatic transmission in response to the at least one operator input command;

receiving, with the computing device, at least one adjusted operator input command associated with adjusting the operation of the hydrostatic transmission to correct a deviation of the work vehicle from the straight path;

generating, with the computing device, an adjusted control command for controlling the operation of the hydrostatic transmission in response to the at least one adjusted operator input command;

receiving, with the computing device, an operator input providing an indication that the adjusted control command corrected the deviation of the work vehicle from the straight path;

calculating, with the computing device, a speed scaling factor for use with a straight tracking control system of the work vehicle based at least in part on the operator input;

storing the adjusted control command in response to the operator input; and controlling the operation of the hydrostatic transmission based on the adjusted control command as the speed scaling factor is being calculated.

12. A computer-implemented method for executing straight tracking control of a work vehicle having an electronically controlled hydrostatic transmission, the method comprising:

receiving, with a computing device, at least one operator input command associated with controlling an operation of the hydrostatic transmission, the at least one operator input command being associated with commanding the work vehicle to be driven along a straight path;

generating, with the computing device, an initial control command for controlling the operation of the hydrostatic transmission in response to the at least one operator input command;

receiving, with the computing device, at least one adjusted operator input command associated with adjusting the operation of the hydrostatic transmission to correct a deviation of the work vehicle from the straight path;

generating, with the computing device, an adjusted control command for controlling the operation of the hydrostatic transmission in response to the at least one adjusted operator input command;

receiving, with the computing device, an operator input providing an indication that the adjusted control command corrected the deviation of the work vehicle from the straight path;

calculating, with the computing device, a speed scaling factor for use with a straight tracking control system of the work vehicle based at least in part on the operator input; and scaling at least one of the initial control command or the adjusted control command to limit a ground speed of the work vehicle based on a predetermined speed limit.

13. A computer-implemented method for executing straight tracking control of a work vehicle having an electronically controlled hydrostatic transmission, the method comprising:

receiving, with a computing device, at least one operator input command associated with controlling an operation of at least one of a first-side drive system or a second-side drive system of the hydrostatic transmission, the at least one operator input command being associated with commanding the work vehicle to be driven along a straight path;

receiving, with the computing device, a first speed signal associated with a first output speed of the first-side drive system and a second speed signal associated with a second output speed of the second-side drive system;

modifying, with the computing device, one of the first speed signal or the second speed signal based on an initial speed scaling factor to generate a corrected speed signal;

generating, with the computing device, an initial control command for controlling an operation of the hydrostatic transmission based at least in part on the corrected speed signal;

receiving, with the computing device, an operator input associated with adjusting the initial speed scaling factor to an adjusted speed scaling factor to correct a deviation of the work vehicle from the straight path; and applying, with the computing device, the adjusted speed scaling factor to generate an adjusted control command for controlling the operation of the hydrostatic transmission.

14. The method of claim 13, wherein receiving the operator input comprises receiving an operator input associated with incrementally adjusting the initial speed scaling factor to the adjusted speed scaling factor.

15. The method of claim 13, wherein applying the adjusted speed scaling factor comprises modifying one of the first speed signal or the second speed signal based on the adjusted speed scaling factor to generate a new corrected speed signal.

16. The method of claim 15, further comprising generating the adjusted control command for controlling the operation of the hydrostatic transmission based at least in part on the new corrected speed signal.

17. The method of claim 13, further comprising receiving an operator input providing an indication that the adjusted speed scaling factor corrected the deviation of the work vehicle from the straight path.

18. The method of claim 17, further comprising storing the adjusted speed scaling factor for subsequent use within a straight tracking control system of the work vehicle.

19. The method of claim 13, further comprising scaling at least one of the initial control command or the adjusted control command to limit a ground speed of the work vehicle based on a predetermined speed limit.

* * * * *